United States Patent [19]
Funamoto et al.

[11] Patent Number: 5,619,351
[45] Date of Patent: Apr. 8, 1997

[54] SURFACE-TYPE ILLUMINATION DEVICE AND LIQUID CRYSTAL DISPLAY

[75] Inventors: Tatsuaki Funamoto; Toru Yagasaki; Fumiaki Akahane, all of Suwa, Japan

[73] Assignee: Seiko Epson Corporation, Tokyo, Japan

[21] Appl. No.: 204,374

[22] PCT Filed: Jul. 13, 1993

[86] PCT No.: PCT/JP93/00965

§ 371 Date: May 10, 1994

§ 102(e) Date: May 10, 1994

[87] PCT Pub. No.: WO94/01795

PCT Pub. Date: Jan. 20, 1994

[30] Foreign Application Priority Data

Jul. 13, 1992 [JP] Japan .................... 4-184976
May 13, 1993 [JP] Japan .................... 5-111852

[51] Int. Cl.[6] .................................. G02F 1/1335
[52] U.S. Cl. .......................... 349/61; 349/5; 349/62
[58] Field of Search ...................... 359/40, 42, 48, 359/49, 50, 70; 362/26, 31, 32, 330

[56] References Cited

U.S. PATENT DOCUMENTS

| | | | |
|---|---|---|---|
| 4,729,067 | 3/1988 | Ohe | 362/26 |
| 4,842,378 | 6/1989 | Flasck et al. | 359/48 |
| 4,974,122 | 11/1990 | Shaw | 362/32 |
| 4,985,809 | 1/1991 | Matsui et al. | 362/31 |
| 5,057,974 | 10/1991 | Milzobe | 362/26 |
| 5,130,898 | 7/1992 | Akahane | 362/31 |
| 5,134,549 | 7/1992 | Yokoyama | 362/31 |
| 5,283,673 | 2/1994 | Murase et al. | 359/49 |
| 5,363,294 | 11/1994 | Yamamoto et al. | 362/330 |

FOREIGN PATENT DOCUMENTS

| | | |
|---|---|---|
| 0317250 | 5/1989 | European Pat. Off. . |
| 0442529 | 8/1991 | European Pat. Off. . |
| 2632432 | 12/1989 | France . |
| 54-40086 | 3/1979 | Japan . |
| 166585 | 7/1986 | Japan . |
| 62-102226 | 5/1987 | Japan . |
| 63-45537 | 3/1988 | Japan . |
| 63-124217 | 8/1988 | Japan . |
| 1183626 | 7/1989 | Japan . |
| 351476 | 5/1991 | Japan . |
| 4102888 | 4/1992 | Japan . |
| 8808149 | 10/1988 | WIPO . |

OTHER PUBLICATIONS

"Advancements in Backlighting Technologies for LCDs," K. Hathaway, Spie Proceedings, High–Resolution Displays and Projection Systems, vol. 1664, Feb. 1992, pp. 108–116. Abstract for 62–102226 May 12, 1987, Japan.

Primary Examiner—William L. Sikes
Assistant Examiner—James A. Dudek
Attorney, Agent, or Firm—Eric B. Janofsky

[57] ABSTRACT

A surface-type illumination device suitable for providing backlight in a liquid crystal display is disclosed. For example, an L-shaped fluorescent light can be used as an illuminant and mounted next to two edges of a substantially rectangular light guide plate. The corner of an edge portion between the two edges is removed. The fluorescent light, the length of whose illuminating portion is long, is positioned with an appropriate gap from the light guide plate allowing for illumination with high brightness and low power consumption. Consequently, when the illumination device is used in a color liquid crystal display, appropriate backlight with high brightness can be obtained. Moreover, because the influence of the temperature from the illumination device is small, a stable color display can be achieved.

18 Claims, 12 Drawing Sheets

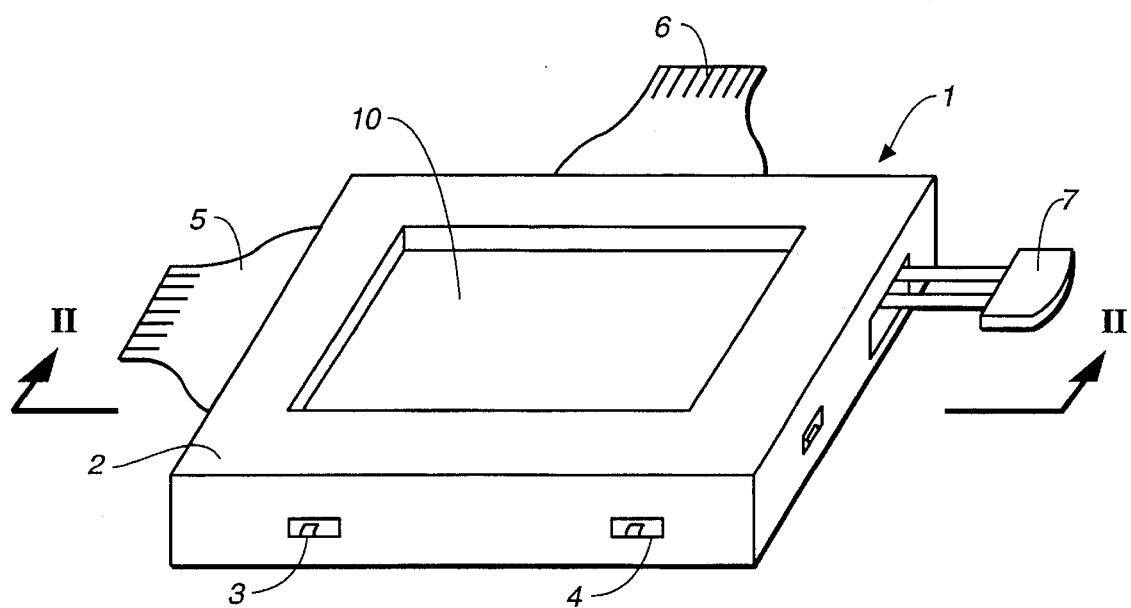
FIG._1
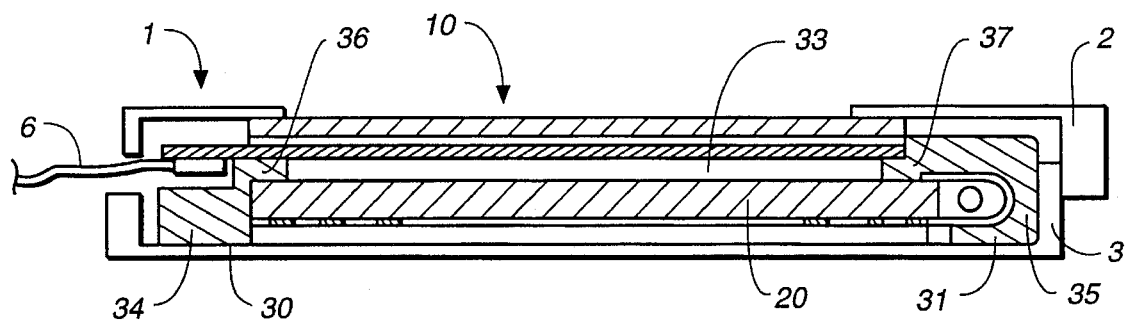
FIG._2

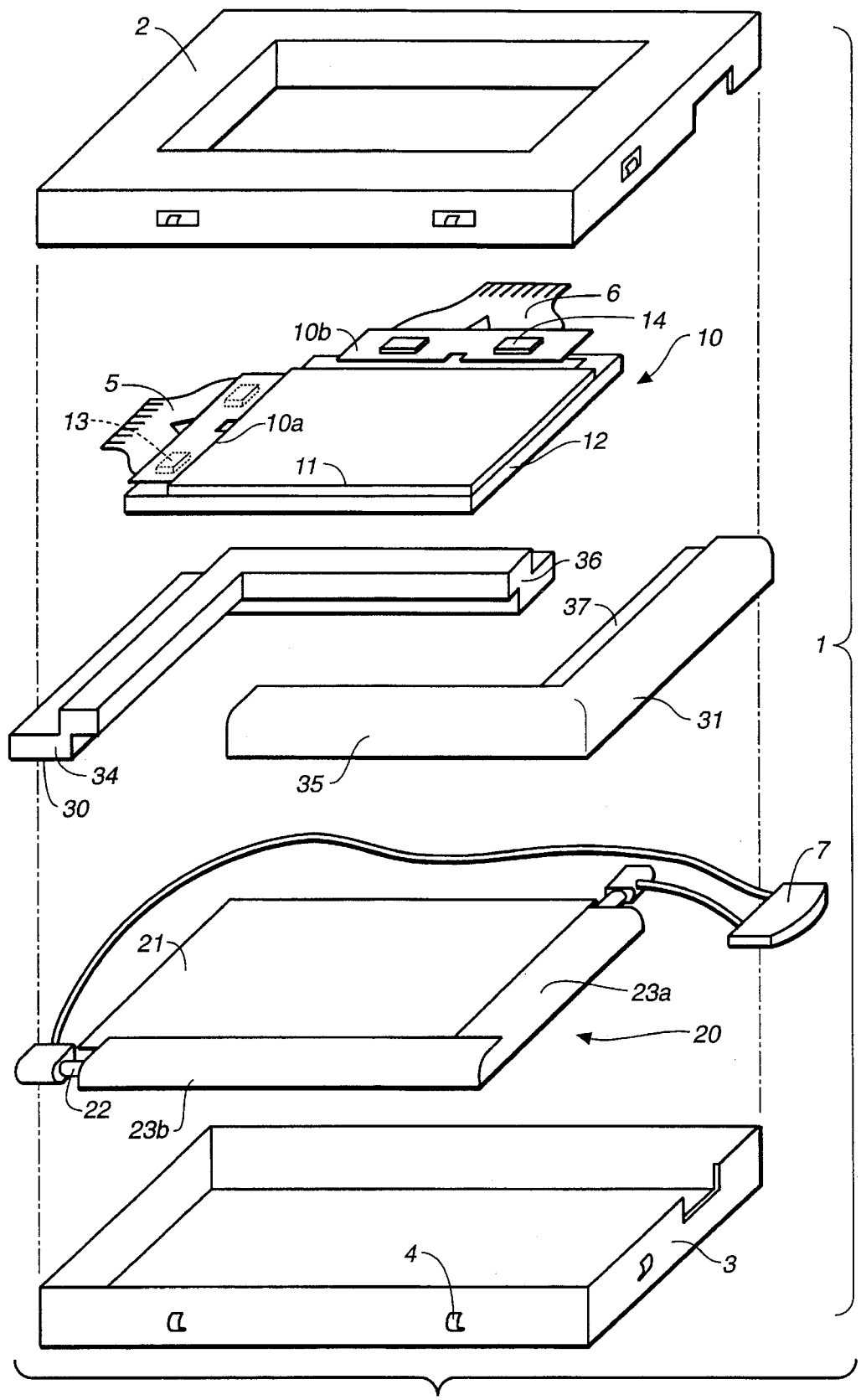
FIG._3

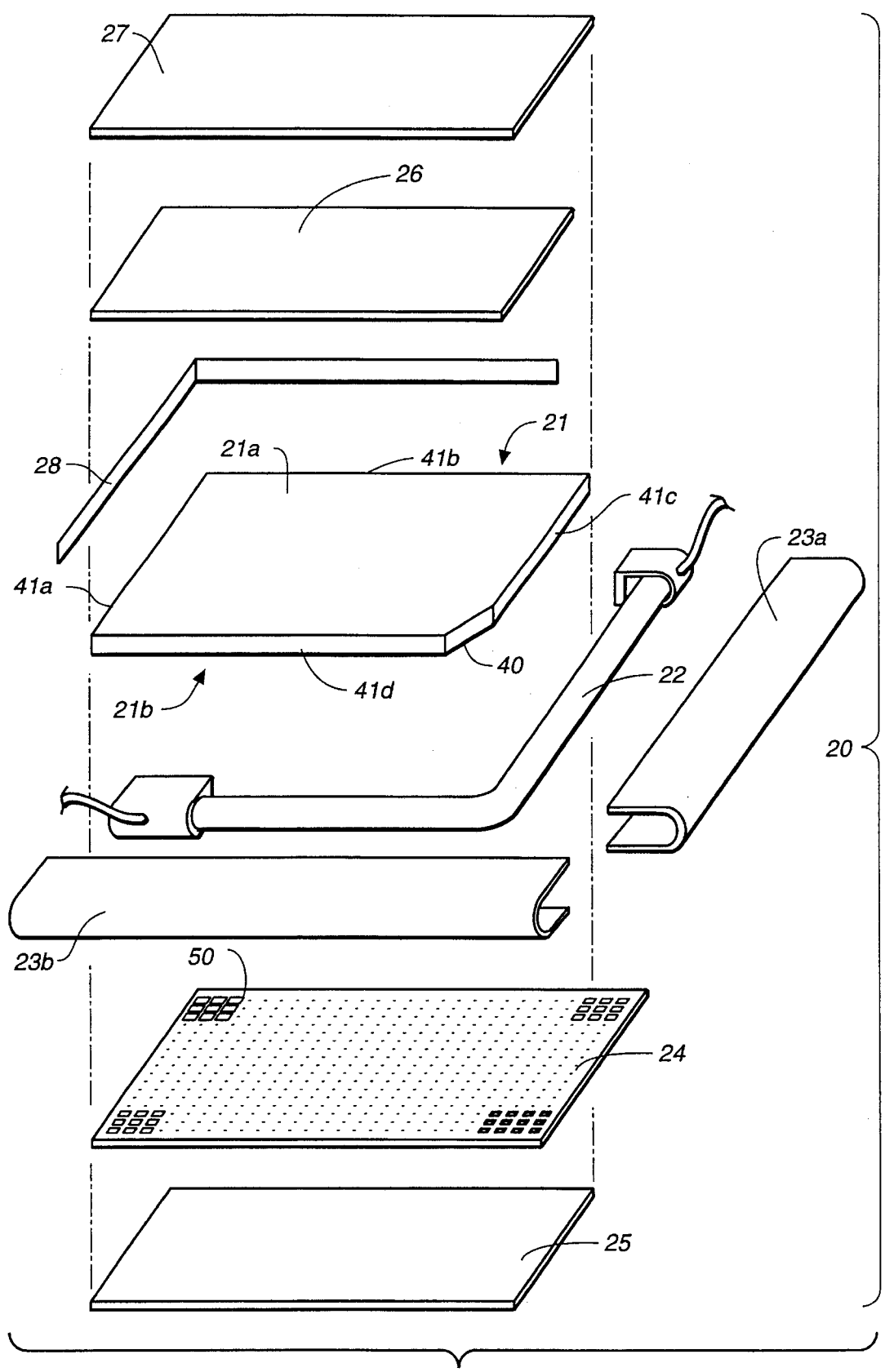
FIG._4

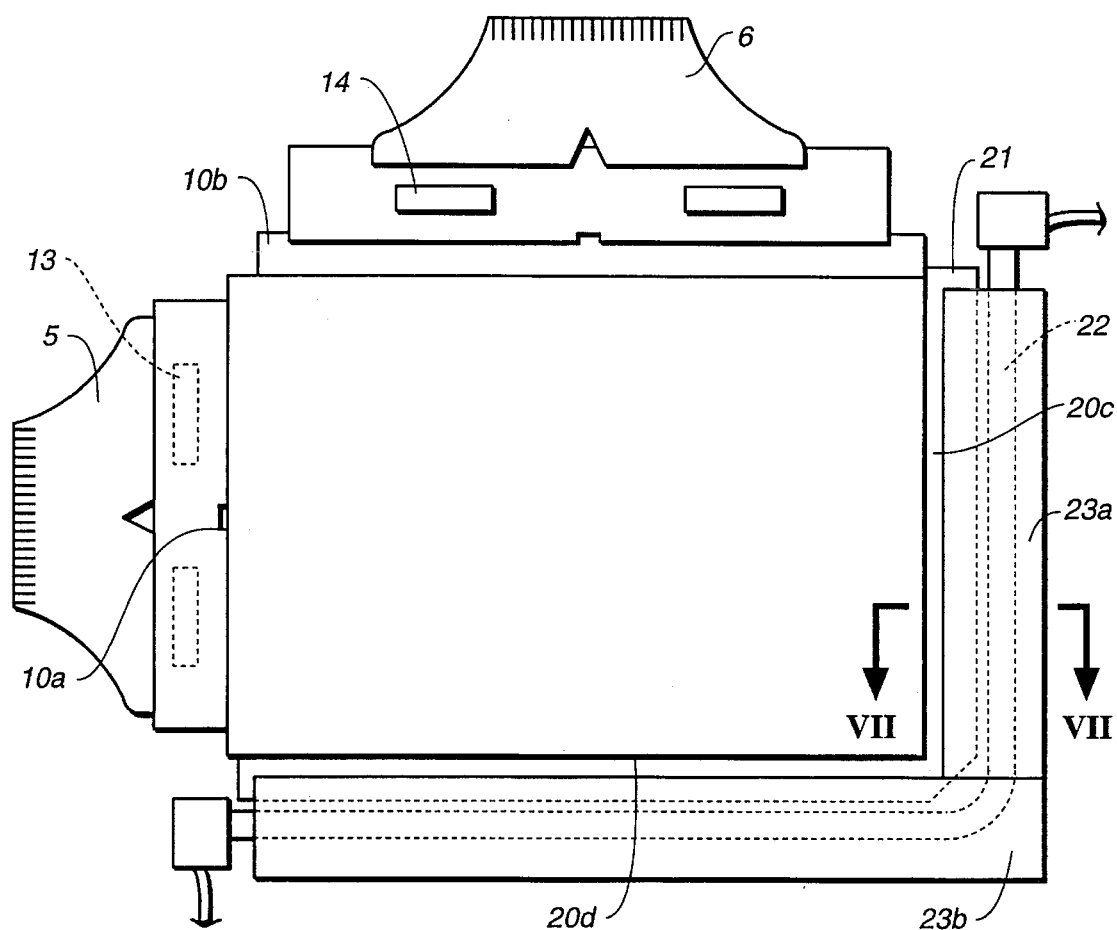
FIG._5
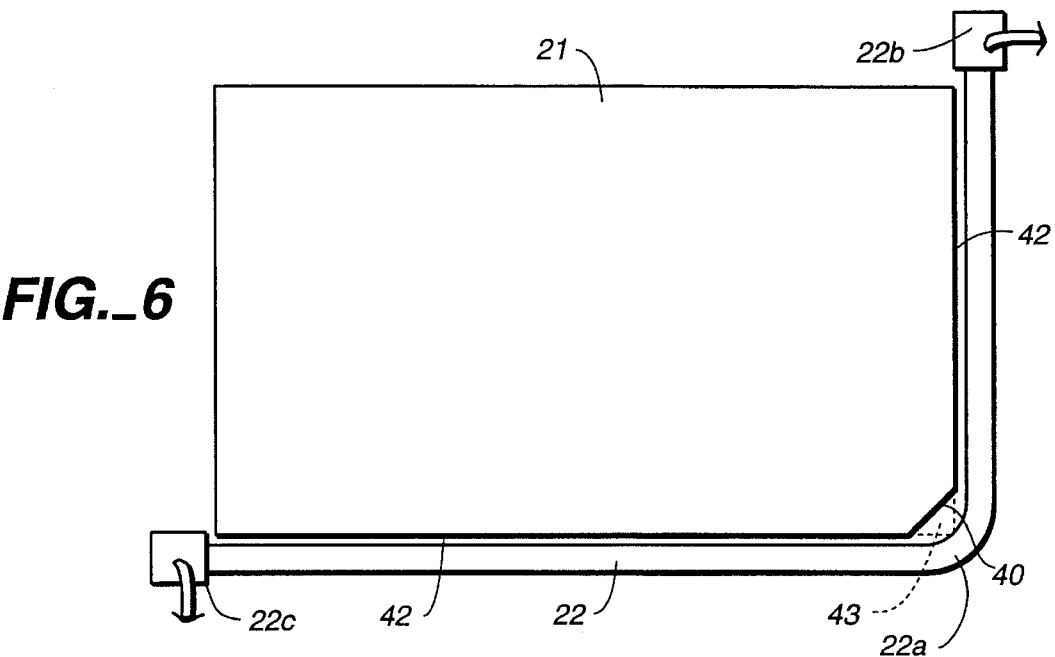
FIG._6

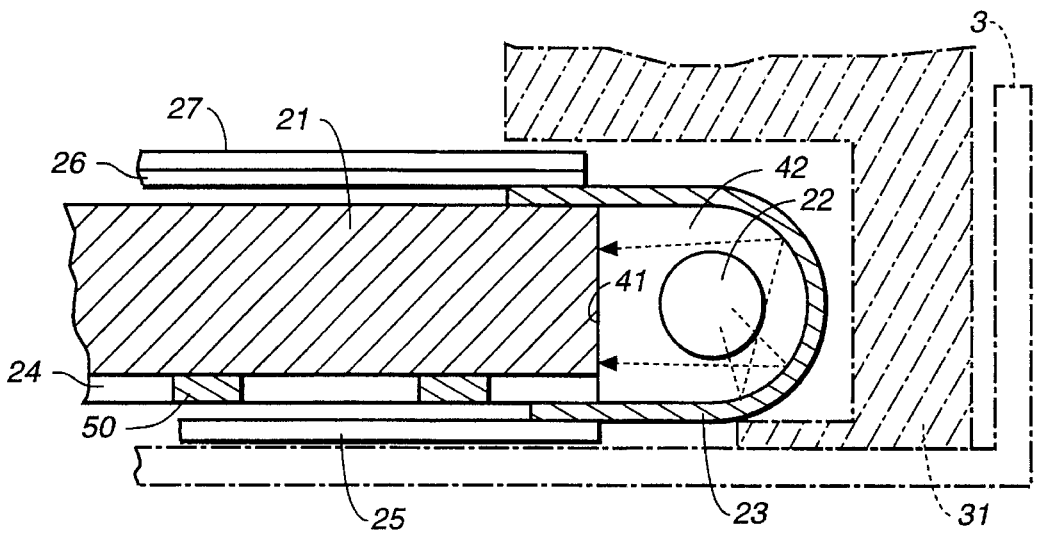
FIG._7
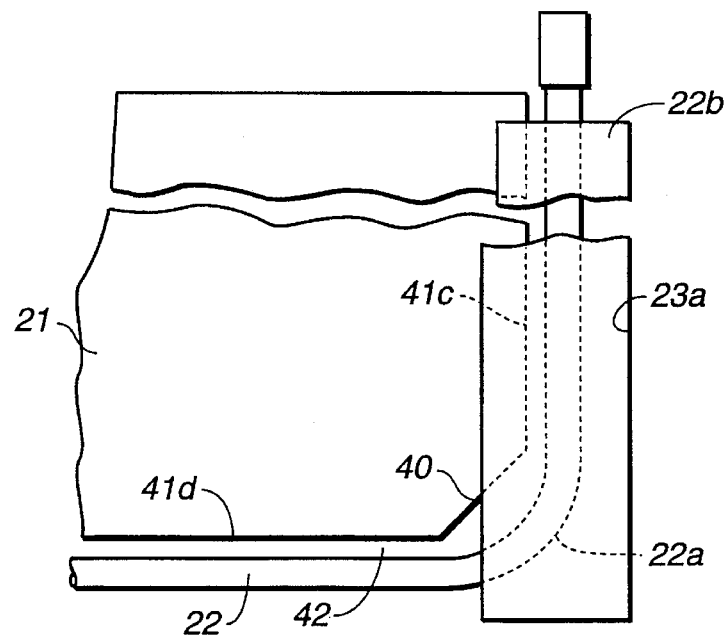
FIG._8A
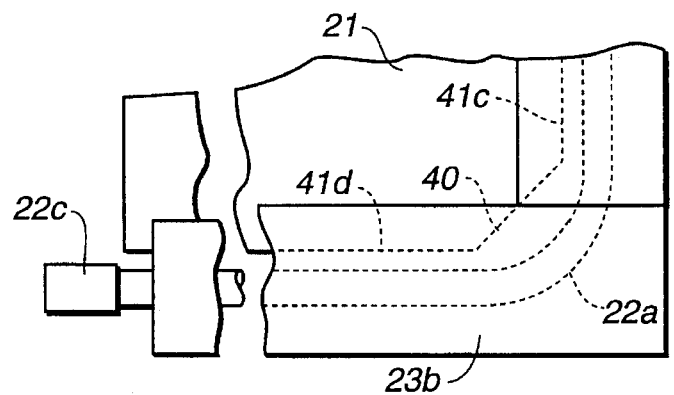
FIG._8B

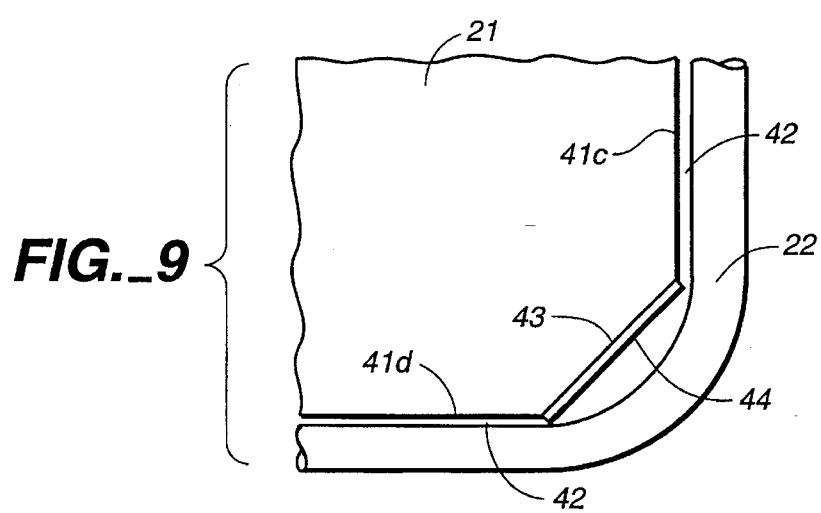
FIG._9
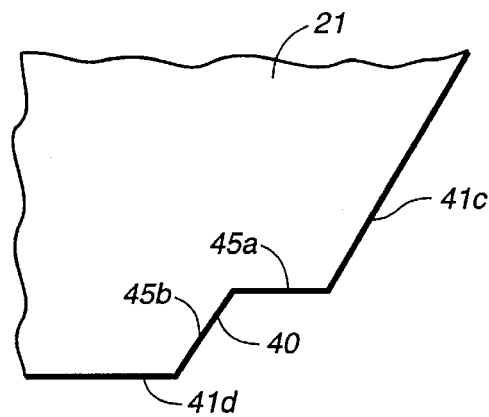
FIG._10A
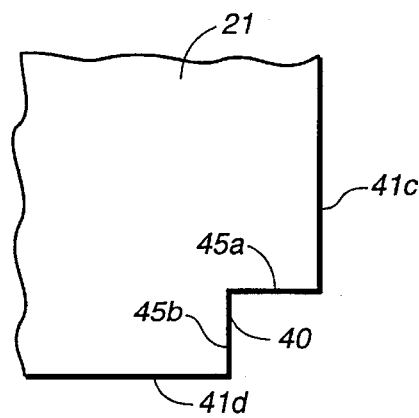
FIG._10B
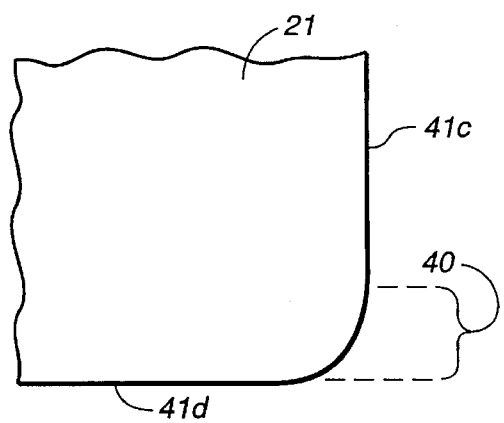
FIG._10C
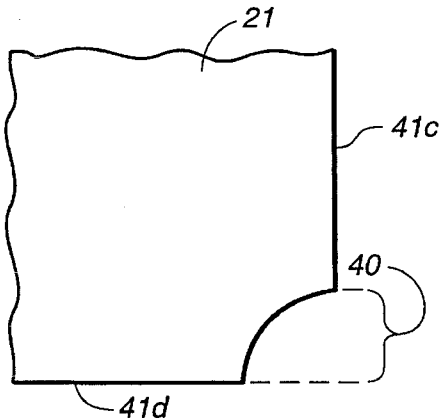
FIG._10D

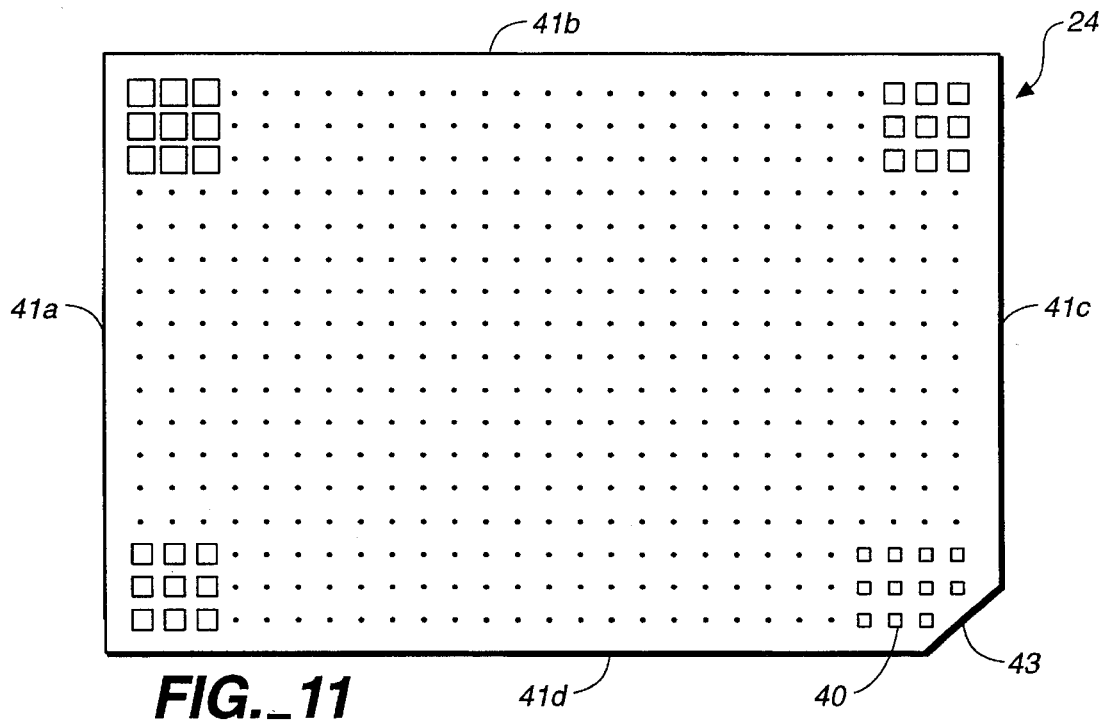
FIG._11
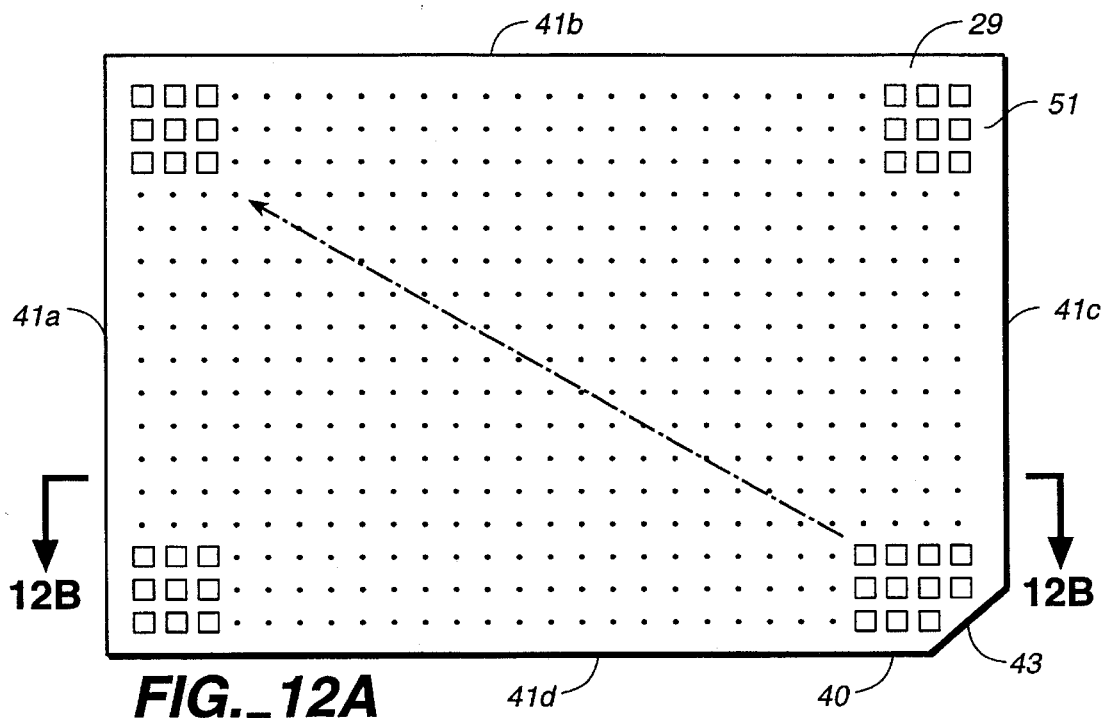
FIG._12A
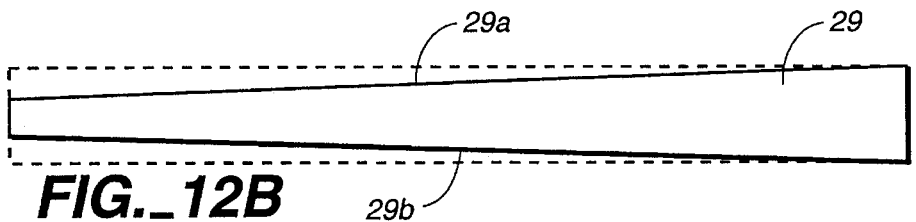
FIG._12B

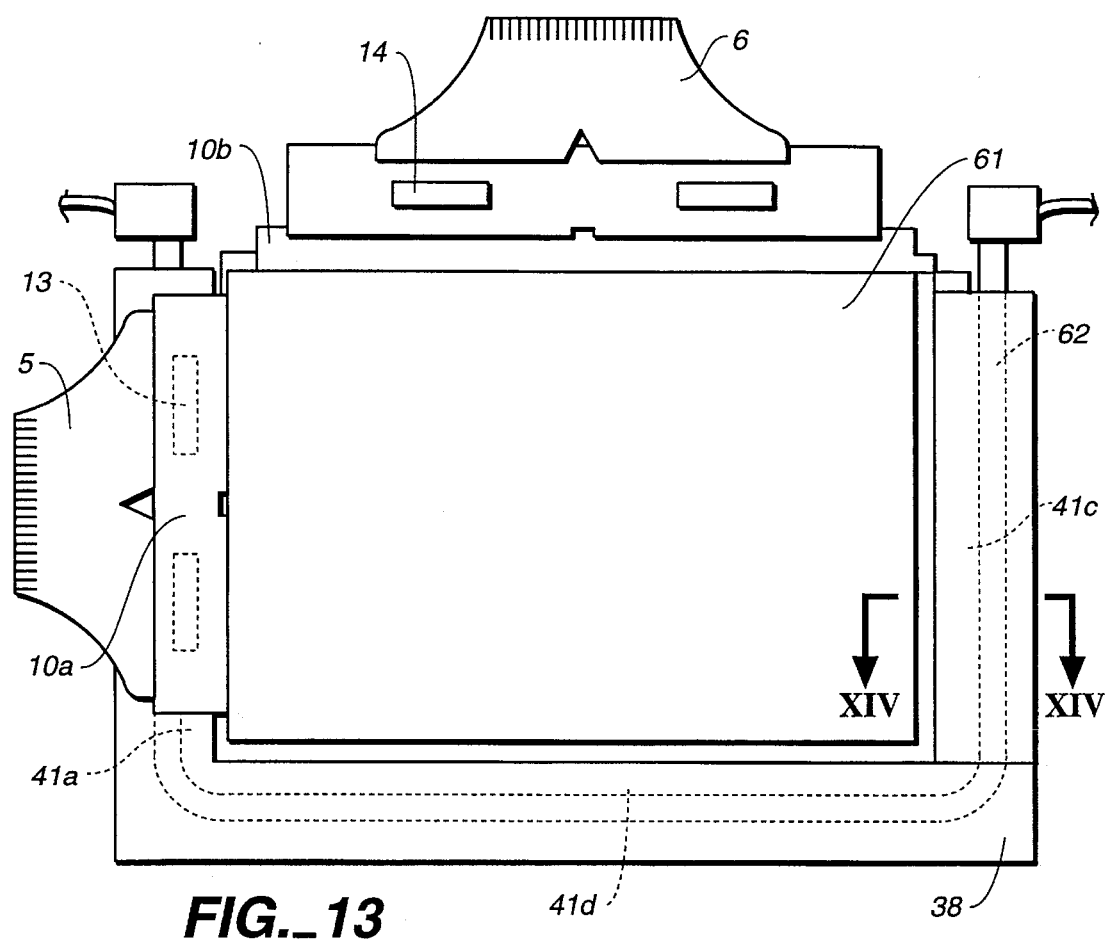
FIG._13
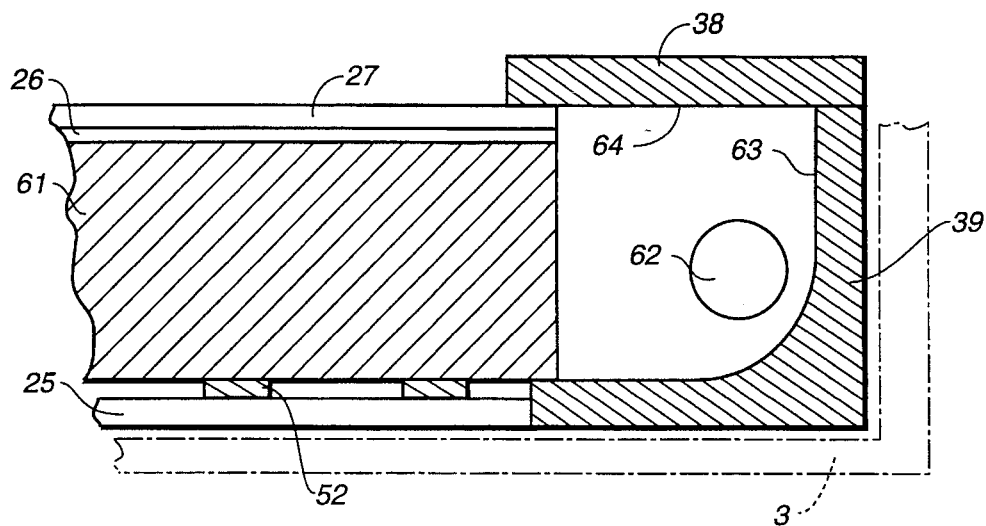
FIG._14

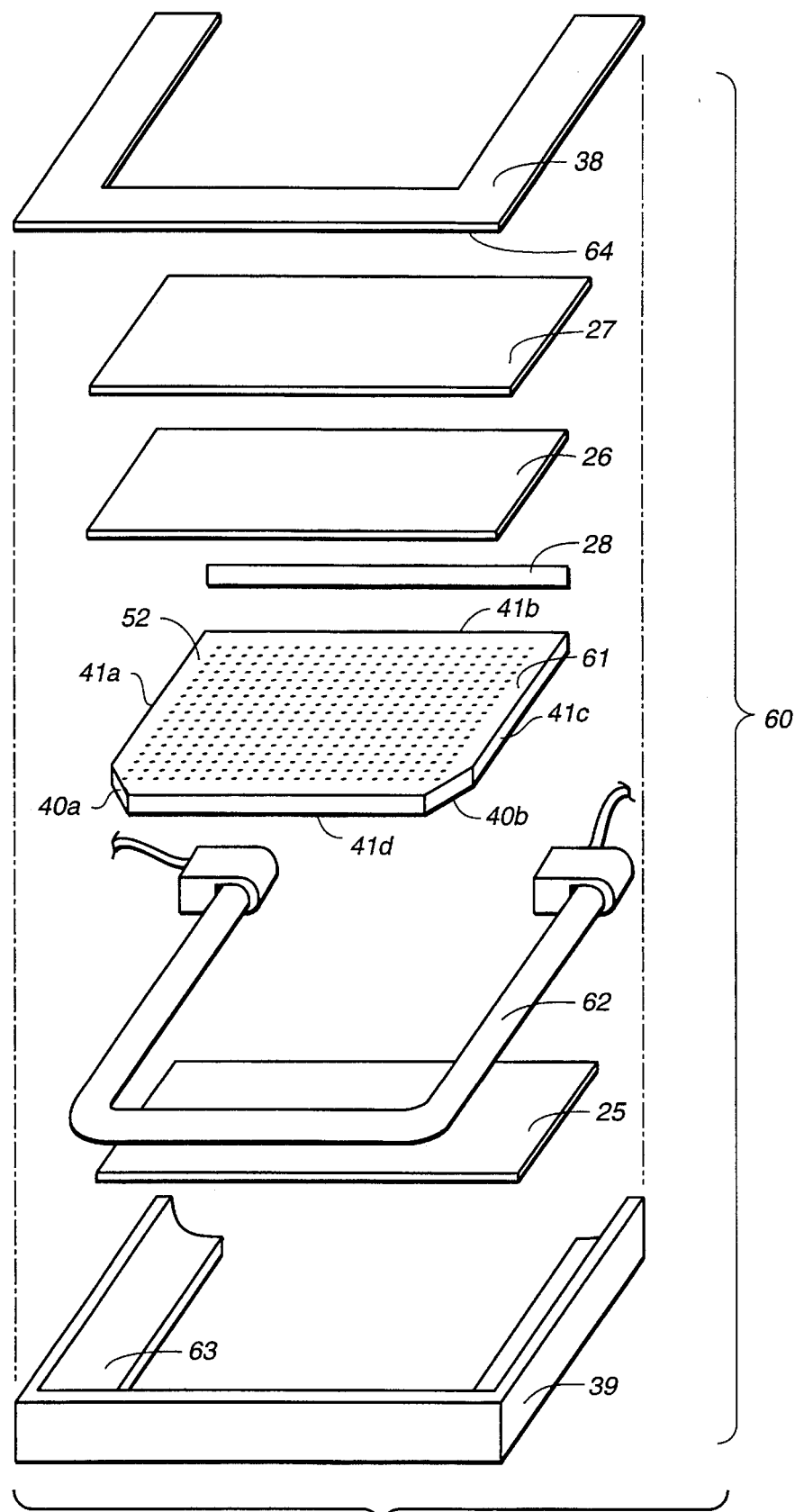
FIG._15

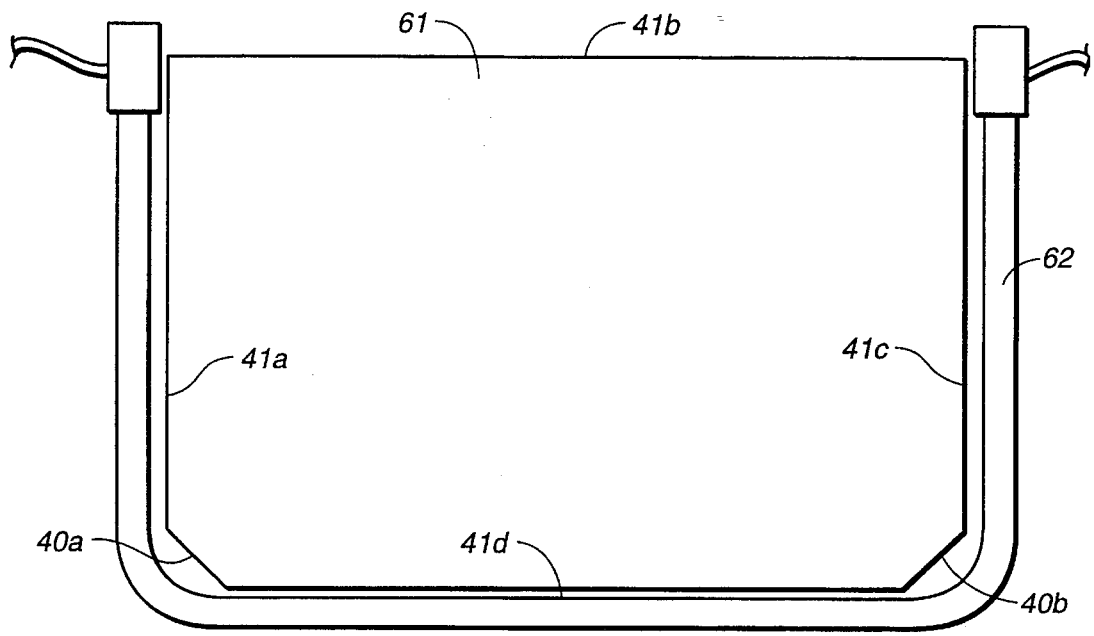
FIG._16
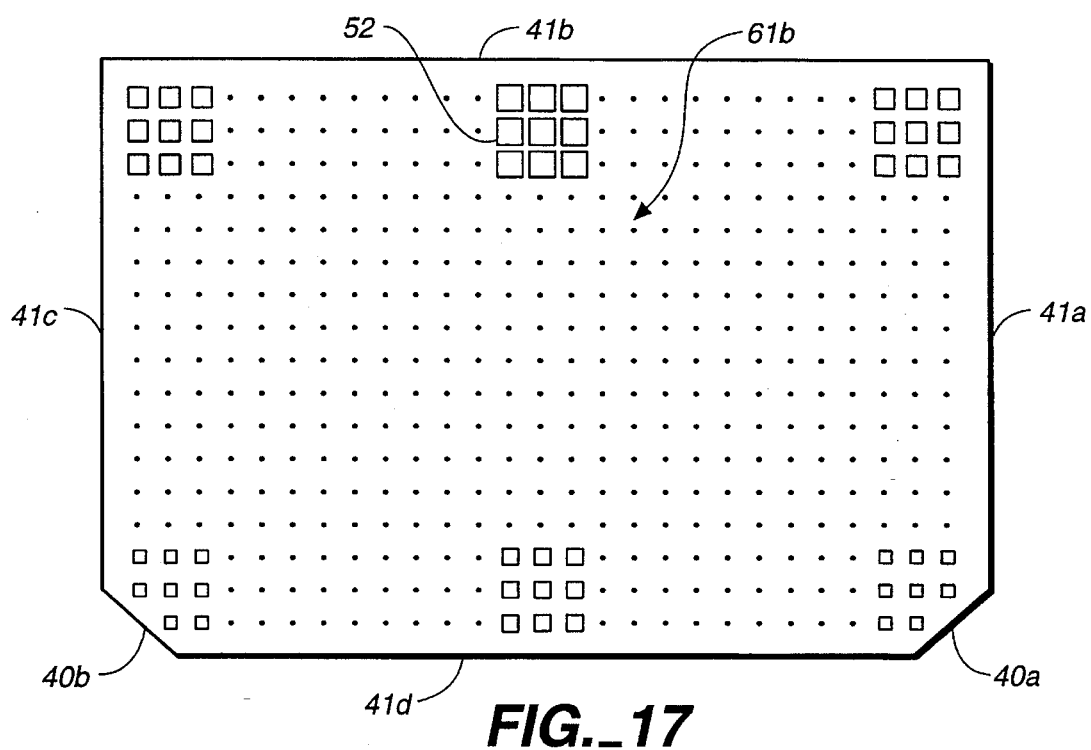
FIG._17

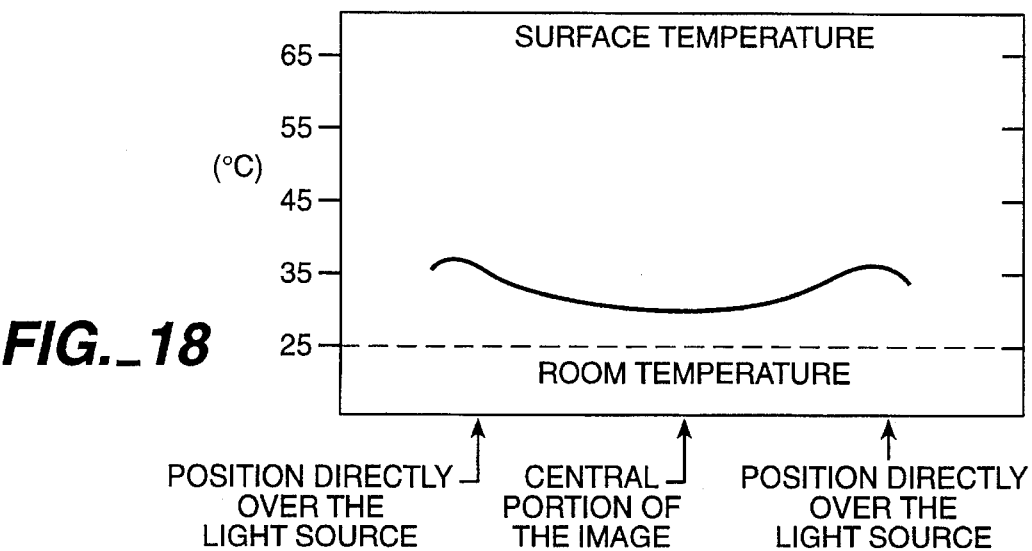
FIG._18
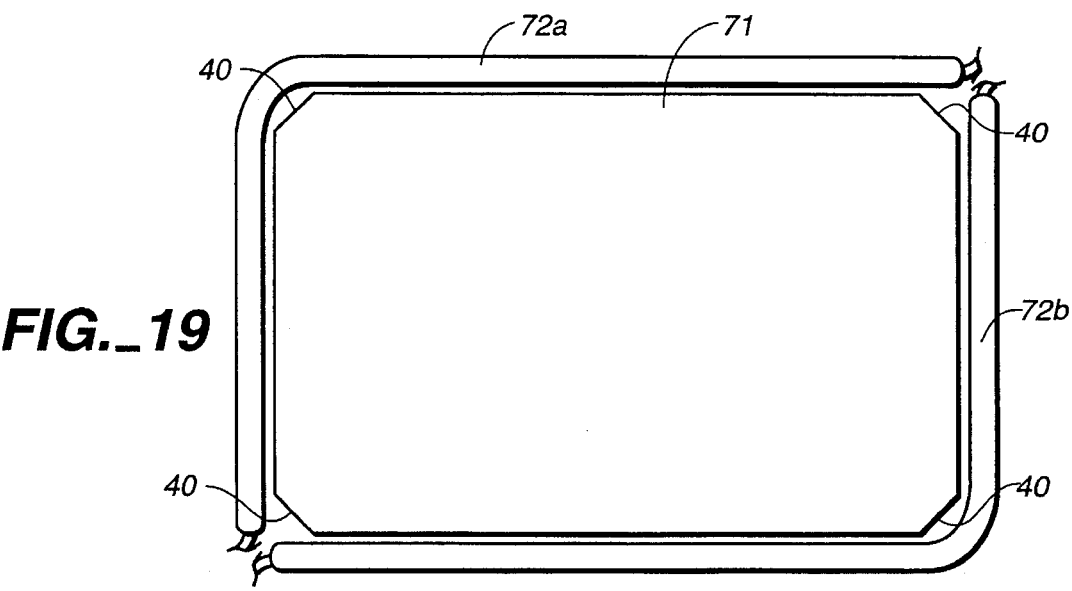
FIG._19
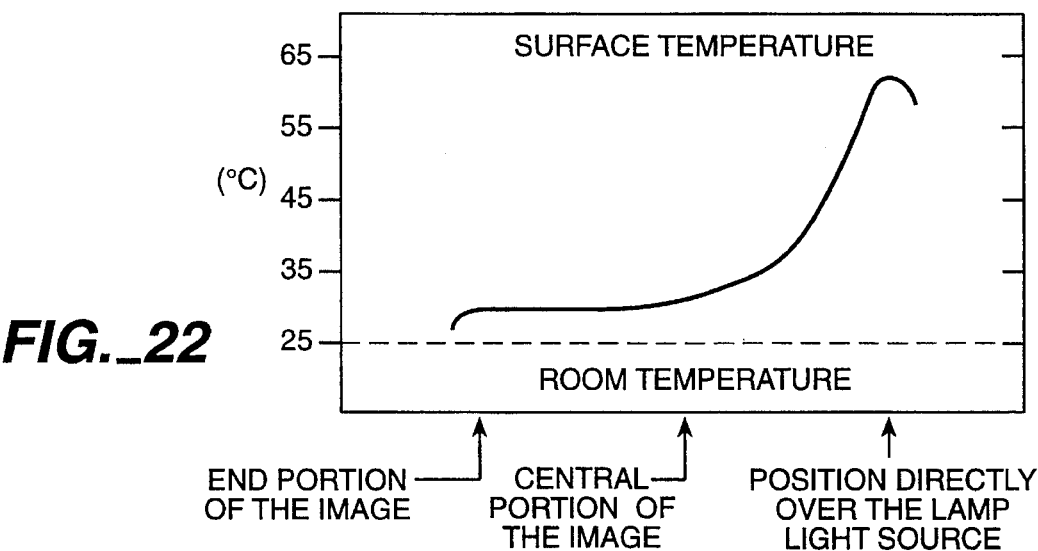
FIG._22

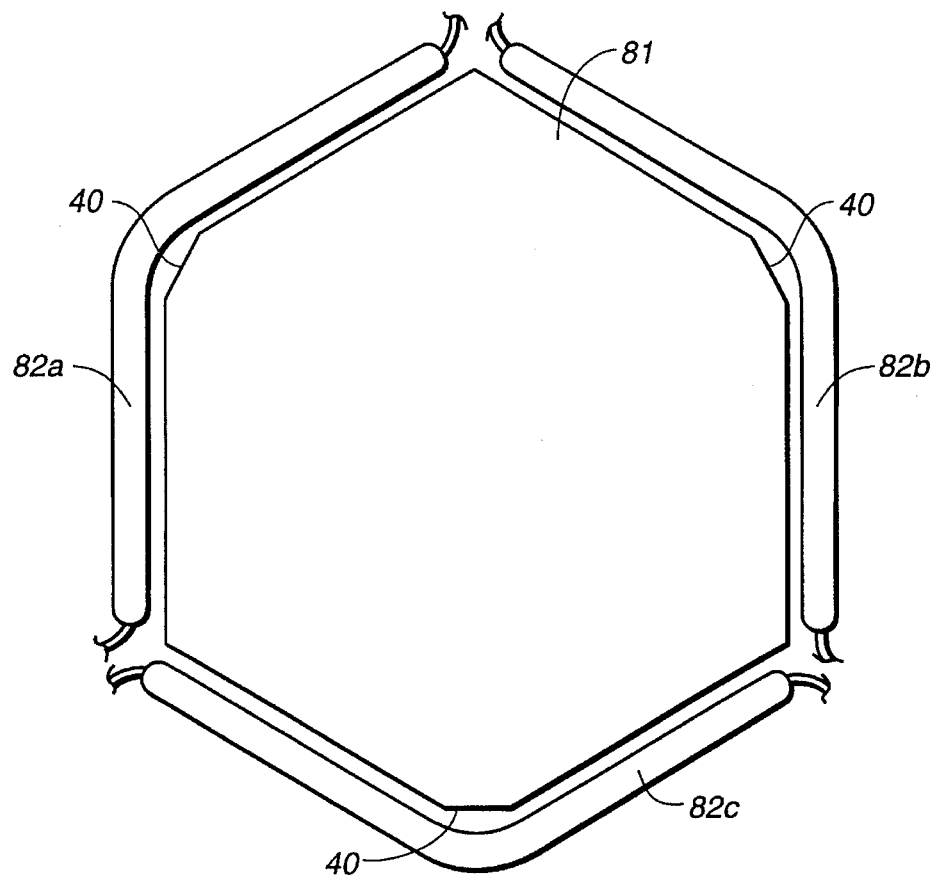
FIG._20
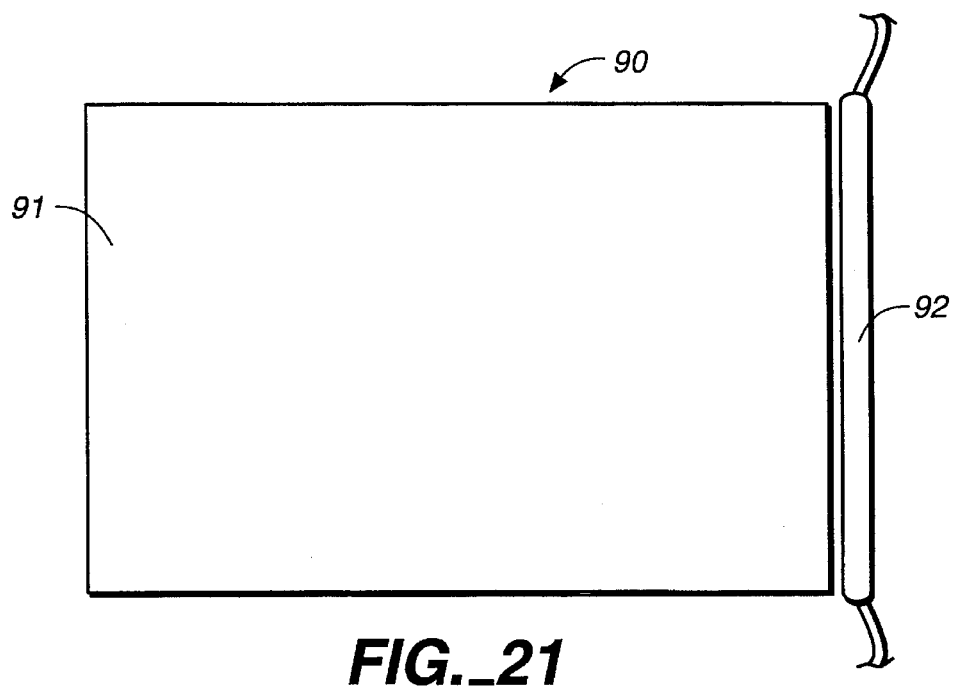
FIG._21

SURFACE-TYPE ILLUMINATION DEVICE AND LIQUID CRYSTAL DISPLAY

FIELD OF THE INVENTION

This invention relates in general to a thin, surface-type illumination device that can be used as a backlight for liquid crystal displays (LCD) and, in particular, to a suitable illumination device for use in a notebook computer display that provides high brightness with low power consumption as well as to a liquid crystal display that uses this illumination device.

BACKGROUND OF THE INVENTION

Surface-type illumination devices with a cylindrical light source and a flat polarizer such as the devices described in Japanese Kokai No. 60-205576 and Japanese Kokai No. 61-248079 are well-known. One such example is shown in FIG. 21. In the illumination device 90, cylindrical fluorescent light 92 is positioned on one side of the substantially rectangular and flat polarizer 91. The light introduced to polarizer 91 from fluorescent light 92 is reflected by the diffusion pattern printed on polarizer 91 and emitted from the surface of the polarizer at a fixed density of light.

This type of surface illumination device, in recent years, has been used extensively as backlights for liquid crystal display panels. The use of liquid crystal display panels are increasing as displays in such things as laptop computers, televisions and cameras. The use of liquid crystal display panels for color displays is also increasing. As the size of personal computers and televisions become smaller, it is imperative that liquid crystal display panels become thinner and lighter.

Accordingly, it is necessary that the surface-type illumination device used for liquid crystal display panels as a backlight, in correlation with the color displays, becomes thinner and lighter with less power consumption. Also, to allow for use in color displays, a sufficient brightness is necessary to clearly show the colors displayed in the liquid crystal. This requires the use of a high output fluorescent light in the illumination device. However, along with the light, heat is also radiated from the high-output fluorescent light. The effect of this heat, as shown in FIG. 22, is great. The temperature may rise 30°–40° C. above a normal temperature of 25° C. Consequently, when this type of illumination device is used as a backlight in an MIM active color display panel or in a STN passive color display panel, a special method to reduce the heat is necessary to control, to a certain extent, the color and brightness irregularities.

In stead of using one high output fluorescent tube, it is also conceivable to increase the number of fluorescent tubes. In this way, it is possible to control to some extent the temperature increase due to the light source. However, as the number of fluorescent tubes is increased, many other problems appear. One of these problems is the variations in the illumination of the fluorescent tubes. Because the illumination intensity of florescent tubes varies according to each tube, it is necessary to adjust such things as the resistance within the fluorescent tube driver circuit to obtain a fixed illumination intensity. Consequently, in the case when several fluorescent tubes are used in one illumination device, extra time is required during the manufacturing process to obtain a balanced and fixed illumination intensity.

Another problem is the increased number of driver circuits required to turn on the fluorescent tubes. The number of these driver circuits can not be easily increased in devices such as microcomputers where thinness and small size are important.

In accordance with the instant invention, a suitable illumination device for color liquid crystal displays can be obtained that are small in size, lightweight, and have high and uniform brightness. Further, it is an object of the invention to provide a surface-type illumination device that can prevent heat generation and its resulting bad effects to the liquid crystal display panel.

Another object of the invention is to provide a surface-type illumination device that, without increasing the number of driver circuits for driving the fluorescent lights, displays a brightness higher than conventional illumination devices and restricts heat radiation.

A further object of the invention is to generate a suitable diffusion pattern to realize a surface-type illumination device, this diffusion pattern being used in the illumination device.

Still another object of the invention is to provide a stable liquid crystal display where the driver IC for driving the liquid crystal display panel is positioned so that it will not be affected by heat.

DISCLOSURE OF THE INVENTION

In accordance with the instant invention, by employing an illuminant longer than conventional illuminants, illumination with high illumination intensity is obtained without increasing the number of driver circuits for driving the illuminants and without concentrating the heat diffusion. Further, by bending the illuminant, light can be introduced along the polygon-shaped polarizer. Also, to maintain proper space between the polarizer and the illuminant and to increase the efficiency of the light introduced to the polarizer, a corner is removed from the edge of the polarizer. In other words, the surface-type illumination device of the instant invention comprises a polarizer which is polygon-shaped and substantially transparent; a diffusion pattern arranged on one side of the polarizer, the diffusion pattern emitting substantially evenly from one side of the polarizer light that is introduced from the illuminant to the other side of the polarizer; and a cylindrically-shaped illuminant bent so that the illuminant faces at least two sides of the polarizer; wherein the edge sandwiched between the at least two sides is processed so that the corner does not protrude.

Through using an illuminant bent along the polarizer, the length per cylindrically-shaped illuminant is long, and an illuminant with large illuminating area can be used. Consequently, the rise in temperature of the illuminant can be kept down and high brightness obtained. Furthermore, an increase in the number of driver circuits that drive the illuminant can be prevented. When bending an illuminant such as a fluorescent light to adjust for interference between the bent portion and the corner of the polarizer, the width or length of the entire illumination device becomes longer, preventing miniaturization. In the instant invention, by removing a corner of the polarizer, the distance between the polarizer and the illuminant can be kept within a fixed range for high incident efficiency, and thus, a highly efficient illumination device that is small in size can be realized.

Further, by using a long illuminant as mentioned above, an improvement in conversion efficiency from power to light is also attained. For example, in illuminants such as a fluorescent light, power to the illuminant is consumed by the cathode drop, which is due to the glow discharge, and consumed by positive column gradient voltage, which is due to light emission. When a plurality of illuminants are used and the input voltage increased, the portion consumed by the cathode drop voltage significantly increases and an increase in the positive column gradient tendency for light emission is small. However, in the illumination device of the instant invention, which uses a long illuminant, power is efficiently converted into light as an increase in the positive column gradient voltage is smaller than the case when the number of illuminants is increased.

The edge of the polarizer can be processed into many different shapes, for example, removing the corner in the shape of an isosceles triangle. In the case of the isosceles triangle, a high incident efficiency of light from the illuminant to the polarizer can be maintained. It is desirable to make the length of one of the sides of the isosceles triangle to be removed in the approximate range of 0.6 times to 1.0 times the smallest radius of curvature of the bent portion of the illuminant so as to realize a small-sized illumination device. Also, in order to prevent light incident from the edge, and to increase the uniformity of the light radiated from the polarizer, it is effective to include a shield at the edge portion to prevent introduction of light from the illuminant.

Also, the corner of the edge may be removed in a diamond-shape. In order to make the incident efficiency high and keep the size of the device small, it is desirable to make the length of one of the sides of the corner removed in a diamond-shape within a range of 0.6 times to 1.0 times the smallest radius of curvature of the bent portion of the illuminant. Also, if all the corners are removed from the edges of the polarizer so that they do no protrude, the directionality of the polarizer disappears and the manufacturing process time required to position the polarizer becomes unnecessary.

It is common to cover the illuminant with a reflector to increase the incident efficiency of the light from the illuminant to the polarizer. When a bent illuminant such as the one described above is used, it is desirable for the reflector to be comprised of a straight first reflector and a second reflector positioned along two of the sides of the polarizer wherein at the edge, the first reflector is covered by the second reflector. It is also possible for the reflector to be comprised of a first reflector that covers the lower half portion of the illuminant on one side of the polarizer and a second reflector that covers the upper half of the illuminant from the other side of the polarizer.

The diffusion pattern that diffuses light incident to the polarizer from the bent illuminant can be generated by the following method. In other words, to generate a diffusion pattern that evenly radiates, from the other side of the polarizer, light introduced from the illuminant to the polarizer in an illumination device where a cylindrically-shaped illuminant is positioned near at least a first side and a second side of a substantially rectangular polarizer, the density distribution per unit area of the diffusion pattern can be found by: finding a predicted emitted light intensity distribution for the y-direction along the first side based on the intensity of the light incident to the polarizer from the second side and the density distribution of a presupposed diffusion pattern; then finding a predicted emitted light intensity distribution for the x-direction along the second side based on the intensity of the light incident to the polarizer from the first side and the density distribution of the presupposed diffusion pattern; and then compensating the density distribution of the presupposed diffusion pattern so that the sum of the predicted emitted light intensity distribution for the x-direction and the predicted emitted light intensity distribution for the y-direction on arbitrary rectangular xy coordinates of the polarizer fit within a fixed range.

When an edge reflector is installed at at least one of the two sides opposite the first side and the second side for reflecting the light from the inner part of said polarizer to said polarizer, it is good to compensate the density distribution by computing the reflected light intensity incident from the edge reflector to the polarizer with a fixed attenuation factor; finding a predicted emitted light intensity distribution for at least one of the xy directions of the reflected light intensity; and adding this to the predicted emitted light intensity distribution found above.

By printing the diffusion pattern described above on the polarizer or by putting on the polarizer a sheet with the pattern formed on it, light introduced from the bent illuminant can be evenly radiated from the polarizer. Similarly, light can be evenly emitted by making the thickness of a polarizer with an even diffusion pattern inversely proportion to the compensated density distribution of the diffusion pattern.

Effects of the heat from the illuminant can be minimized by using as a bent illuminant an L-shaped illuminant and by placing in a position opposite the illuminant a driver device such as a driver IC for driving the liquid crystal display. Consequently, as the threshold value of the driver does not become unstable due to the heat, a color display with stable contrast is obtained. Further, a high quality display with high brightness and a small illumination device is also obtained.

Further, a stable, high quality display can be obtained that reduces heat using an even longer U-shaped illuminant. The brightness of the display is easy to adjust when illuminants such as L-shaped and U-shaped illuminants are used because nearly the same intensity of light is incident from the periphery of the polarizer. Of course, an O-shaped illuminant can also be arranged around the periphery of a rectangular polarizer as well as an illuminant bent to fit the shape of any other polygon.

BRIEF DESCRIPTION OF THE DRAWINGS

FIG. 1 is a sketch of a liquid crystal display using the surface-type illumination device in accordance with the first embodiment of the invention.

FIG. 2 is a cross-sectional view of FIG. 1 showing the structure of the liquid crystal display.

FIG. 3 is a break-down view showing the structure of the liquid crystal display of FIG. 1.

FIG. 4 is a break-down view showing the construction of the surface-type illumination device used in the liquid crystal display of FIG. 1.

FIG. 5 is a top plan view illustrating the combination of the surface-type illumination device and the liquid crystal display panel shown in FIG. 4.

FIG. 6 is an explanatory drawing showing the positioning of the polarizer and fluorescent light of the surface-type illumination device of FIG. 4.

FIG. 7 is a cross-sectional view showing the relationship of the polarizer, fluorescent light, and reflector of the surface-type illumination device of FIG. 4.

FIG. 8 is an explanatory drawing showing the assembly of the reflector of FIG. 7.

FIG. 9 is an enlarged view of the edge of the polarizer.

FIG. 10 is an enlarged view showing several possible edge formations of the polarizer.

FIG. 11 is an explanatory drawing showing the diffusion pattern formed on the diffusion sheet, this diffusion sheet being stuck to the polarizer.

FIG. 12(a), which differs from FIG. 11, is a plan view showing a polarizer where the thickness has been changed.

FIG. 12(b), which differs from FIG. 11, is a cross-sectional view showing a polarizer where the thickness has been changed.

FIG. 13 is a top plan view showing the combination of the liquid crystal display panel and illumination device in accordance with the second embodiment of this invention.

FIG. 14 is a cross-sectional view showing the relationship of the liquid crystal display panel, illumination device, and illuminant as shown in FIG. 13.

FIG. 15 is a breakdown view of the structure of the surface-type illumination device shown in FIG. 14.

FIG. 16 is an explanatory drawing showing the relationship of the polarizer and the fluorescent light which is in the surface-type illumination device of FIG. 15.

FIG. 17 is an explanatory drawing showing the diffusion pattern that is printed on the polarizer of FIG. 15.

FIG. 18 is a graph showing the surface temperature of the liquid crystal display panel shown in FIG. 13.

FIG. 19 is an explanatory drawing showing a relationship, different from above, of the polarizer and the fluorescent light.

FIG. 20 is an explanatory drawing showing a [still further different relationship] of the polarizer and the fluorescent light.

FIG. 21 is an explanatory drawing showing a conventional polarizer and fluorescent light.

FIG. 22 is a graph showing the surface temperature of a liquid crystal display panel using a surface-type illumination device similar to the one shown in FIG. 21.

BEST MODE FOR IMPLEMENTATION OF THE INVENTION

The embodiments of the instant invention are explained below using the above drawings as reference.

EMBODIMENT 1

FIG. 1 is a sketch of liquid crystal display 1 in accordance with one embodiment of this invention. Liquid crystal display 1 is constructed with liquid crystal display panel 10 and an illumination device to be described later sandwiched between upper case 2 and lower case 3. Upper case 2 and lower case 3 are fixed in place by tooth 4. The scanning data that comprises the image is supplied from the host side to each row or column through tape electrode 5 and tape electrode 6. This data is latched by a driver IC which will be described below, is synchronized, and is supplied to liquid crystal display panel 10 where the image is formed. Power is supplied from the driver circuit of the host side to the fluorescent light comprising the illumination device through connector 7, connector 7 extending past liquid crystal display 1 and used lighting.

The basic structure of one embodiment of liquid crystal display 1 will be explained using the cross-sectional view of liquid crystal display 1 shown in FIG. 2 and the break-down view of liquid crystal display 1 shown in FIG. 3. In liquid crystal display 1, illumination device 20 is installed in lower case 3. Above that, liquid crystal display panel 10 is installed using frame 30 and 31. Liquid crystal display panel 10 is formed by enclosing the liquid crystal, transparent electrodes and such between two layers of transparent glass substrates 11 and 12. At side 10a of liquid crystal display panel 10, a plurality of driver ICs 13 are installed for latching pixel data for the rows and sending it to the liquid crystal display panel. Also, at side 10b, which is adjacent to side 10a, a plurality of driver ICs 14 are installed for latching pixel data for the columns and sending it to the liquid crystal display panel.

Frames 30 and 31 are used to protect illumination device 20 and to position it within the case. At the same time, it also fills the role of maintaining a fixed distance for gap 33 between illumination device 20 and liquid crystal display panel 10, for example, 0.2–1 mm. For this reason, frames 30 and 31 are prepared so that their lower halfs 34 and 35 support illumination device 20 and their upper halfs 36 and 37 act as spacers between illumination device 20 and liquid crystal display panel 10. In this example the frame is divided into two pieces, however, the number of pieces is not limited to two. For example, three pieces, four pieces, or even more is possible, and even just one piece is also conceivable. Furthermore, the frame need not cover the entire periphery of illumination device 20 or liquid crystal display panel 10. A plurality of pieces may be arranged in appropriate places.

Illumination device 20 is a surface-type illumination device set up with a cylindrically-shaped fluorescent light 22 at the edge of substantially rectangular polarizer 21. Fluorescent light 22 is roughly L-shaped and is covered by reflectors 23a and 23b. Wires for supplying power to drive fluorescent light 22 extend from both ends of fluorescent light 22 and are connected to the driver circuit on the host side through connector 7 which is for turning on the light. FIG. 4 is a break-down view of illumination device 20 and will be used to explain the structure of this embodiment of the illumination device. Illumination device 20 is comprised of polarizer 21, which is substantially rectangular in shape and is missing the corner of edge 40, fluorescent light 22, which encompasses edge 40 in an L-shape, and reflectors 23a and 23b, which cover fluorescent light 22 in the direction of polarizer 21 and efficiently reflect light from fluorescent light 22 to polarizer 21. On lower surface 21b of polarizer 21, the side opposite of the side where liquid crystal display panel 10 is arranged, pattern sheet 24, which is printed with diffusion pattern 50, and reflecting sheet 25 are arranged in that order. On upper surface 21a of polarizer 21, the side where liquid crystal display panel 10 is arranged, diffusion sheet 26 and prism sheet 27 are arranged. Edge reflective tape 28 is installed at edge 41a and 41b, opposite fluorescent light 22 of polarizer 21.

Polarizer 21 is a transparent material whose index of refraction is greater than that of air. An index of refraction equal to or greater than 1.41 is desirable using such materials as acrylic resin, polycarbonate resin, amorphous polyolefine-type resin, and polystyrene resin. Use of these type of materials for polarizer 21 result in a critical angle of 45° or less. If upper surface 21a and lower surface 21b are smooth and mirror-like, the light incident from edges 41a, 41b, 41c, and 41d, which are formed at right angles to surface 21a and 21b, is completely reflected from surfaces 21a and 21b.

Pattern sheet 24 is a transparent sheet with a fixed number of diffusion patterns 50 printed on it, the printed diffusion patterns being adhered to the lower surface 21b of polarizer 21. Light incident from sides 41, to some extent, reach diffusion pattern 50 and, without being completely reflected will be diffused in the direction of upper surface 21a. Consequently, light incident from the fluorescent light by way of edges is emitted to the liquid crystal display panel 10 from upper surface 21a.

Reflecting sheet 25 is a thin PET sheet with a thickness approximately 0.05–0.5 mm. Light coming from upper surface 21a from polarizer 21 through diffusion pattern 50 travels through the diffusion sheet 26 or prism sheet 27, which are arranged on the upper portion of upper surface 21a and light up liquid crystal display panel 10. However, a portion of the light is reflected through sheet 26 and 27 in the lower direction. The light reflected from the upper direction is returned to polarizer 21, among others, through reflecting sheet 25. Reflecting sheet 25 may also be aluminum or other non-PET material. Also, lower case 3 may be used in place of a reflecting sheet as a reflector. Further, the frame of a computer or such carrying the illumination device or liquid crystal display of the instant invention can also be used as a reflector in place of the reflecting sheet.

Diffusion sheet 26 is an approximately 0.05–0.5 mm thin PET sheet or PC sheet. Diffusion sheet 26 diffuses the light that is reflected by diffusion pattern 50 and radiated from upper surface 21a. Diffusion pattern 50 is often formed in a narrow line configuration or net configuration. The light that is reflected by these types of patterns is diffused by diffusion sheet 26. The diffusion pattern cannot be recognized from the liquid crystal display panel 10. Diffusion sheet 26 is arranged with a very small layer of air between it and the upper surface 21a of polarizer 21. The angle mentioned above is maintained in regards to the angle of upper surface 21a. Reflection sheet 26 is not limited to a PET sheet and such sheets as acrylic-type sheets, among others, may be used.

Prism sheet 27, which is arranged on diffusion sheet 26, is made up of very small linear prisms lined in a cross-sectional array. The angle of the light radiating from diffusion sheet 26 is arranged to improve the illuminating intensity of the liquid crystal display panel 10. Although the brightness can be improved through prism sheet 27, when sufficient brightness is achieved through diffusion sheet 26, prism sheet 27 can be omitted, thus reducing manufacturing cost.

Fluorescent light 22, which is used as the light source of illumination device 20, is in an L-shape, and is positioned adjacent to edges 41c and 41d of polarizer 21. It is desirable, as will be explained later, to maintain a gap between edges 41c and 41d and fluorescent light 22 of around 0.8–1.5 mm. The corner of edge 40 of polarizer 21 is removed and the fluorescent light 22 is able to be positioned with the above noted gap. Also, through removing this corner, fluorescent light 22 and the corner of polarizer 21 are kept from touching and such things as damage to the fluorescent light can be prevented.

Fluorescent light 22 is covered by reflectors 23a and 23b to make the light discharged from fluorescent light 22 incident with good efficiency from edge 40 of polarizer 21. Reflectors 23a and 23b are PET sheets deposited with silver and of a thickness of approximately 0.01–0.1 mm. In order to provide low cost reflectors that cover the L-shaped fluorescent light and that are easy to install, two straight reflectors are used. This will be explained in greater detail below.

Edge reflective tape 28 is arranged at the two edges 41a and 41b, which are opposite the edges 41c and 41d where fluorescent light 22 and reflector 23 are installed. Edge reflective tape 28 is a PET sheet deposited with silver with thickness of approximately 0.01–0.1 mm. The light introduced to polarizer 21 from fluorescent light 22 is completely reflected away. The light that reaches the edges of the opposite side is returned back to polarizer 21. Materials such as white PET sheets, aluminum, and such can be used for the edge reflective tape as well as the reflectors mentioned above. It is also possible to integrate these into the case or frame as well.

FIG. 5 shows the installment of liquid crystal display panel 10 on illumination device 20. Driver IC 13 and 14 are arranged on sides 10a and 10b, adjacent to liquid crystal display panel 10. Opposite sides 10a and 10b, L-shaped fluorescent light 22 extends along the two sides 20c and 20d of illumination device 20. Because of this arrangement, driver IC 13 and 14 are not directly influenced by the heat from fluorescent light 22. Consequently, the temperature of the driver IC does not rise significantly, preventing changes in the driver's threshold value. For this reason, an image with very low fluctuations in contrast can be obtained using liquid crystal display panel 10.

Through using a light like the L-shaped fluorescent light 22 shown in FIG. 6, the temperature distribution of the entire liquid crystal display panel 10 becomes flat. In order to illuminate liquid crystal display panel 10 for color displays, high brightness is essential. Because of this, as explained earlier using FIG. 22, the output of conventional fluorescent lights that are installed at one edge is increased and the slope of the temperature distribution of the liquid crystal display panel becomes large. This results in color and brightness irregularities and poor display quality. However, by introducing light from two edges, like in the instant invention, a rise in the temperature of the liquid crystal display panel can be suppressed and high brightness obtained.

When introducing light from two edges, it is possible to use two fluorescent lights. This makes it possible to restrict the temperature increase of the liquid crystal display panel as compared to the method of introducing light from only one edge. However, as two driver circuits would be necessary to drive the two fluorescent lights, this would not very well be able to be incorporated into small personal computers and televisions. In the instant invention, temperature rise can be suppressed and a high brightness obtained without increasing the number of driver circuits.

Also, because the light conversion efficiency can be increased through using an L-shaped fluorescent light, temperature rise can be further prevented. The majority of the power input into the fluorescent light is consumed as a cathode drop voltage which generates glow discharge. For example, when two fluorescent lights are used, two times the power is required, with most of it being consumed in order to generate two glow discharges. However, when a long fluorescent light is used, such as in the instant invention, the cathode drop voltage consumed by glow discharge does not increase that much. Because of this, when two times the power is supplied, most of the increased power is consumed as a positive column gradient voltage in generating light. Consequently, the same brightness can be obtained with lower voltage and lower temperature rise. For this reason, the rise of the temperature of the liquid crystal display panel can be held down and a good quality image can be obtained. Also, because the power consumption can be kept down, it is a suitable illumination device to be used for illumination in liquid crystal display panels in small, portable devices where batteries are used as the power source.

There are many merits of the illumination device of the instant invention which uses L-shaped fluorescent light 22. However, it is not as easy as just installing L-shaped fluorescent light 22 at edge 40 of polarizer 21. This is because corner 43 of rectangular-shaped polarizer 21 (when the corner has not been removed) and bent portion 22a of fluorescent light 22 interfere with each other and therefore, gap 42 between edge 41 and fluorescent light 22 becomes exceedingly large. When gap 42 cannot be reduced, the entire illumination device 20 becomes larger and the scale of the liquid crystal display cannot be reduced. Also, when the gap between edge 41 and fluorescent light 22 becomes larger, the light introduced to edge 41 decreases. Reflector 23 can, to some extent, prevent the decrease of the light from fluorescent light 22, but a large reflector is required. However, in polarizer 21 of the instant invention, edge 40, which interferes with fluorescent light 22, is removed so that the corner does not stick out and gap 42 is reduced. Through removing the corner of edge 40, damage to fluorescent light 22 due to corner 43 impacting fluorescent light 22 during shipping and such can be prevented. Also, damage to fluorescent light 22 caused by thermal expansion of polarizer 21, vibration, and such can be prevented.

Gap 42 between edge 41 and fluorescent light 22 is not completely eliminated. Not only do problems with precision during product manufacturing exist, but if gap 42 is reduced too much, the light reflected to reflector 23 is absorbed by fluorescent light 22 and the introduction efficiency from surface 41 is reduced. In FIG. 7, the light radiated from fluorescent light 22 to the opposite side of edge 40 is reflected by reflector 23 and introduced to edge 40. Consequently, if gap 42 is too small, the reflected light is introduced to fluorescent light 22 and completely absorbed within fluorescent light 22 and, thus, the amount of light introduced to edge 40 is reduced. If gap 42 is large, the incident efficiency improves, but when the distance of gap 42 exceeds a prescribed value, the increase in the incident efficiency becomes less to the extent that limiting the size of illumination system 20 becomes more desirable. An appropriate gap 42 is judged by this inventor to be approximately 0.8–1.5 mm. More specifically, in the case of fluorescent light 22 with a diameter of 2.5–4 mm, a gap of around 1–1.5 mm is desirable.

The light reflected from reflector 23 is an important light source for illumination device 20. Although there are several different ways of setting up a reflector with respect to bent fluorescent light 22 of the instant invention, one method, as shown in FIG. 8, is to use two reflectors 23a and 23b which are made from flat material and bent in a nearly half circular shape. Reflector 23a corresponds to the short side of polarizer 21 and is long enough to cover from bent portion 22a to electrode 22c of the short side of bent fluorescent light 22. Likewise, reflector 22b corresponds to the long side of polarizer 21 and is long enough to cover from bent portion 22a to electrode 22c on the long side of bent fluorescent light 22. At the time of manufacture of illumination system 20, one of the reflectors is first arranged, for example, the shorter reflector 23a. If the next reflector is laid from the top of the first reflector to the other side, for example, longer reflector 23b, fluorescent light 22 can be completely covered. In this way, two separate reflectors 23a and 23b can be used to easily cover bent fluorescent light 22 and assembly of the reflector is made easy. Also, in conforming to the bent-shape of fluorescent light 22, reflector 23a and 23b do not have a complex shape, but rather, a simple straight-line shape is used and therefore manufacturing cost can be kept down.

The aperture ratio is vital to raising the incident efficiency from fluorescent light 22 to edge 40. A desirable range for this aperture ratio, which is defined as [(thickness of polarizer 21)/(diameter of fluorescent light 22)], is around 0.9–2. If the aperture ratio is higher, the incident efficiency does not improve much.

The removal of several different types of shapes from the corner of edge 40 is possible. In this embodiment of the invention, a corner in the shape of an isosceles triangle is removed from edge 40. Edge 43, which makes an angle of approximately 45° with respect to both edge 41c and 41d, is formed by edge 40. Because the light directly incident to edges 41c and 41d from fluorescent light 22 is reflected at edge 40, the influence of this portion to the intensity of the light radiated from upper surface 21a of polarizer 21 is small. The influence of this removed shape to the uniformity of the brightness is small. However, with the scattered light that differs from the incident angle, there is the fear that the brightness uniformity incident from edge 43 and radiated from upper surface 21 will be hindered. In the instant invention, reflective member 44 is installed to prevent light incident to polarizer 21 from edge 43. A plastic sheet deposited with white, silver, or aluminum among others or even a molded part can be used as reflecting member 44. This reflects light rays from leaving polarizer 21 and passing through edge 43 and, oppositely, shields light rays entering from fluorescent light 22, maintaining brightness uniformity. As edge 40 becomes larger, the light introduced from polarizer 21 is reduced in the vicinity of the edge. Consequently, in order to maintain uniformity of brightness, it is desirable to establish limitations for the size of the triangle shape that will be removed. On one hand, if too little is removed, gap 42 between fluorescent light 22 and edge 41 cannot be properly maintained. Considering this, it is found desirable to make the length of the substantially equal in length sides of the triangle to be, within the range of 0.6 to 1.0 times the smallest radius of curvature of bent portion 22a of fluorescent light 22.

FIG. 10 shows other shape possibilities that are used in other embodiments of the invention. FIGS. 10(a) and 10(b) are examples of the corner removed from edge 40 being parallel to adjacent sides 41c and 41d. In order to make this type of shape edge 40 should be cut in a diamond shape, or in a square shape if the polarizer is rectangular. Edges 45a and 45b, which are cut in a diamond-shape, are approximately parallel to adjacent edges 41c and 41d of polarizer 21. Consequently, the light introduced to polarizer 21 from these edges 45a and 45b have substantially the same vector as edges 41c and 41d, and the probability of light being incident from the edges or being emitted is substantially the same. Therefore, it is rare for edge 40 to exert an influence on the uniformity of the brightness of the light radiated from the illumination device. For this reason, even if reflecting member 44 is omitted, it is still possible to obtain uniform brightness. However, it is difficult to maintain good uniformity if the gap between the edge and the fluorescent light becomes large. In considering the fluorescent light and interference, it is found to be desirable to make the length of one of the diamond-shaped sides, as noted above, to be within the range of 0.6 to 1.0 times the smallest radius of curvature of bent portion 22a of fluorescent light 22.

FIGS. 10(c) and 10(d) show examples of shapes of edge 40 when attention is paid to the manufacturing process of polarizer 21. In the case of injection formation of polarizer 21 and from the aspect of type processing, a "fan-shape" as shown in FIG. 10(c) can be used. In the case of machining polarizer 21 to form edge 40, an "opposite fan-shape" is also possible. Of course, other shapes are also possible.

FIG. 11 shows diffusion pattern 50 for emitting light introduced to polarizer 21 from bent fluorescent light 22 to the liquid crystal display panel from upper surface 21a of polarizer 21. Although in this embodiment diffusion pattern 50 is printed on pattern sheet 42, it is also possible to print directly on lower surface 21b of polarizer 21. It also is, of course, possible to draw diffusion pattern 50 on the lower surface of polarizer 21 through such methods as etching. Although line patterns and dot patterns are most commonly used, other patterns, as well as increasing or decreasing the pattern area density at different places is also possible.

In the case of the dot diffusion pattern, a method of increasing or decreasing the area of each dot or a method of increasing or decreasing the dot density are both possible for adjusting the area density of the pattern. FIG. 11 shows an example of a pattern where the area of the dots are increased or decreased. The dot areas are small near edges 41c and 41d where fluorescent light 22 is positioned and these areas gradually increase as they move towards the opposing edges 41a and 41b. The area near edge 40 which is by bent portion 22a of fluorescent light 22 has the smallest areas and the corner opposite this between edge 41a and 41b has the largest areas.

The density distribution S(x,y) of this diffusion pattern is described below. Here, x and y are coordinates along edges 41c and 41d of fluorescent light 22, and a coordinate axis is used that increases in the direction away from fluorescent light 22. For some small area, the density distribution of a diffusion pattern is assumed in advance to be $Sx_iy_j$. The intensity $l_{1/1}$ of the light diffused by the diffusion pattern of density distribution $Sx_1y_1$ as it relates to the light incident from the x direction with an intensity of Lx is found by the following equation, where k is a certain reflection coefficient.

$$l_{1/1} = Lx \times Sx_1y_1 \times k \qquad (1)$$

The intensity of the light diffused at the next small area in the x direction, $l_{2/1}$, is found by the following equation.

$$l_{2/1} = (Lx - l_{1/1}) \times Sx_2y_1 \times k \qquad (2)$$

Similarly, the intensity $l_{1/j}$ of the light diffused by the diffusion pattern of density distribution $Sx_iy_j$ and emitted by each small area as it relates to the light incident from the y direction with an intensity of Ly is found by the following equation.

$$l_{i/j} = (Lx - \Sigma_{a=1}^{i-1} l_{a/j}) \times Sx_iy_j \times k + (Ly - \Sigma_{b=1}^{j-1} l_{i/b}) \times Sx_iy_j \times k \qquad (3)$$

The average intensity radiated, $l_{ave}$, is represented by the following equation, where n is the number of the small areas in the x axis direction and m is the number of the small areas in the y axis direction.

$$l_{ave} = \Sigma_{i=1}^{n} \Sigma_{j=1}^{m} l_{i/j} / (n \times m) \qquad (4)$$

Keeping the intensity of the light diffused by the diffusion pattern in a fixed range is necessary in order to make the brightness of illumination device 20 uniform. Consequently, the density distribution $Sx_iy_j$ of the diffusion pattern assumed in advance must be compensated and is represented by the following equation.

$$S^1 x_i y_j = Sx_i y_j \times l_{ave} / \Sigma l_{i/j} \qquad (5)$$

Just as above, the intensity of the light diffused at each small area using the compensated density distribution $S^1 x_i y_j$ of the diffusion pattern is recalculated. If this intensity can be kept within the permitted range, a diffusion pattern with proper brightness uniformity will be generated. If, despite using the once compensated density distribution $S^1 x_i y_j$, the intensity of the light is not kept within the fixed range, repeat the compensation with the above technique.

In this way, when the diffusion pattern is generated, based on the intensity of the incident light in both the x and y direction, the intensity of the light emitted by diffusion at each coordinate, or each small area, is calculated for all directions. Along with finding the light intensity emitted at each small area that composes the intensity, the average light intensity is found and the density distribution of the diffusion pattern is compensated so that variations of the light intensity emitted from each small area will be kept within the average light intensity and fixed range.

Further, it is desirable to compensate for the intensity of the light reflected from edge reflective tape 28 which is placed on edges 41a and 41b. For the intensity of the light reflected from edge 41a and 41b by edge reflective tape, it is appropriate to add the intensity of the light that is diffused and emitted to the calculation of $l_{i,j}$, the intensity of light emitted from each small area.

The following is an equation for Lx, the intensity of light reflected from edge 41a in the x direction.

$$Lx' = (Lx - \Sigma_{l=1}^{a} l_{l/j}) \times \eta \qquad (6)$$

In this equation, $\eta$ is the reflection coefficient of the edge reflective tape. A number, for example, such as 0.5 may be used. Consequently, by performing a further calculation to that discussed above, a density distribution of the diffusion pattern compensated for edge reflection can be generated for the light source of the intensity incident from coordinate $x_a$ in the x direction. And, by using diffusion pattern 50 which follows this density distribution, illumination with a high uniform brightness can be achieved through the polarizer.

FIG. 12 shows an example of increasing and decreasing the thickness of the polarizer instead of forming a diffusion pattern that differs in density on the polarizer. In this example of polarizer 29, diffusion pattern 51, which has a fixed density distribution, is printed on lower surface 29b. The cross section of polarizer 29 is formed in inversely proportional to the density distribution of the diffusion pattern discussed above. In other words, edges 41c and 41d of polarizer 29 are thick and the thickness become gradually thinner in the direction of edges 41a and 41b. When the thickness of polarizer 29 is thinned in inverse proportion to the density distribution of the diffusion pattern as found above, the density of the light, which is illuminated by the diffusion pattern of uniform density formed on lower surface 29b, increases. Consequently, the intensity of the light diffused by diffusion pattern and emitted from upper surface 29a is averaged just the same as the light emitted by the diffusion pattern with the density distribution as found above. A polarizer such as polarizer 29 shown in FIG. 12 can, therefore, also obtain illumination with high uniform brightness.

Illumination device 20, as explained above, uses as its light source one long fluorescent light that is bent in an L-shape and can be installed at the polarizer which has a corner removed. Consequently, the effective overall length of the fluorescent light can be extended and the gross luminous energy raised without increasing the number of driver circuits used for turning on the fluorescent light. Also, the necessity when there are a plurality of fluorescent lights to adjust such things as the driver circuit so the brightness of the plurality of fluorescent lights are in agreement does not exist. Further, because the light conversion efficiency can be raised, power consumption can be reduced. In terms of the output of the driver circuit for turning on the fluorescent light, although it is necessary to raise the output ability because the overall length of the fluorescent light is extended, when compared with the case of turning on two fluorescent lights, the output of the driver circuit is low.

Illumination device 20 has various uses as a surface-type illuminant besides the liquid crystal display discussed above. When used as a backlight in a liquid crystal display panel, the fluorescent light can be arranged in a place opposite the liquid crystal driver IC because an L-shape fluorescent light is used. For this reason, the effects of heat from the illuminant to the driver IC can be kept to a minimum and a stable display obtained. Also, as the illuminant and driver IC have no positional interferences, the size of the liquid crystal display can be reduced. Further, the power consumption of the illumination system is low, the heating power per unit length is low as the illuminating portion is long, and the temperature rise of the liquid crystal panel can, to a great extent, be kept down. Consequently, when high brightness necessary for color displays is shown, color and brightness irregularities of the liquid crystal panel can be prevented and a good quality, vivid color display obtained.

Further, to simplify the manufacturing process and obtain a display with uniform illumination and good display quality for the illumination device and liquid crystal display, many things such as the shape of the reflector and the generation method of the diffusion pattern are improved and a low-cost liquid crystal display with good display quality provided.

Above, only one corner from edge 40 of the polarizer is removed. However, it is also possible to remove all four corners. If all four corner are removed in the same shape, the directionality of the polarizer becomes unimportant at the time of assembly and the manufacturing process can be further simplified.

EMBODIMENT 2

FIG. 13 shows a liquid crystal display using an illumination device 60, which differs from that described above, and liquid crystal panel 10 installed on illumination device 60. Concerning this liquid crystal display, the drawings and descriptions substantially similar to the embodiment shown in FIG. 1 are eliminated. Also, the same figure numbers for liquid crystal display panel 10 and other parts that are in common with the first embodiment will be used and the descriptions eliminated. Illumination device 60 uses a U-shaped fluorescent light 62 as a light source. Fluorescent light 62 is positioned next to edges 41a, 41c and 41d, three of the four edges 41a–41d formed on polarizer 61 of illumination device 60. Illumination device 60 is enclosed within frames 38 and 39, which are divided into an upper and lower section. Upper frame 38 acts as a spacer to secure the gap between liquid crystal display panel 10 and illumination device 60.

The construction of illumination device 60 of this embodiment will be explained using FIGS. 14 and 15. Within the U-shaped lower frame 39 of illumination device 60 are enclosed the following in the order from bottom to top, reflecting sheet 25, polarizer 61, diffusion sheet 26, and prism sheet 27. U-shaped fluorescent light 62 is installed next to three of the edges of polarizer 61, 41a, 41c, and 41d. The remaining edge 41b is equipped with edge reflecting tape 28. On top of lower frame 39, which encloses all of these, is the flat, L-shaped upper frame 38.

The mirror surface of the hyperbolic curve section of the inner surface 63 of lower frame 39 is formed by silver deposition or the like. The lower surface 64 of upper frame 38 is also silver deposited and mirrorized. The inner surface 63 and lower surface 64 of frame 39 and 38, respectively, perform the function of a reflector, thus integrating the reflector and frame described in the previous embodiment into one part. Consequently, the troubles due to assembling illumination device 60 is further reduced.

The explanation of the functions of reflection sheet 25, diffusion sheet 26, and prism 27 will be omitted as they are the same as that explained in the earlier embodiment. In this example, the pattern sheet is omitted because the diffusion sheet 52 is printed on lower surface 61b of polarizer 61. The two corners are removed from edge 40a and 40b of polarizer 61 in order to install U-shaped fluorescent light 62 with an appropriate gap 42 at the polarizer, as has explained in the embodiment above. FIG. 16 shows the relationship of fluorescent light 62 and polarizer 61. The corners of edge 40b, which is between edges 41c and 41d, and edge 40a, which is between edges 41a and 41d, are removed so that they do not stick out. In this way, fluorescent light 62 can be installed with fixed gap 42 near edge 41, and the incident efficiency towards polarizer 61 maintained at a high level. Also, damage to fluorescent light 62 due to such things as thermal expansion and shock can be prevented. The shape of the removed corner, in this example, is a triangle with two sides of approximate equal length. However, as explained earlier, it is of course possible to use other shapes as well.

FIG. 17 shows diffusion pattern 52, which is printed on polarizer 61, when looking from the direction of lower side 21b of polarizer 21. Diffusion pattern 52 is formed by using the density distribution generated by the generation method discussed above. In this embodiment, because in addition to edge 41c there is a light source 41a, the area density of the diffusion pattern on this side is low and the area density of the diffusion pattern in the middle of lower surface 21b is high. Also, the area density of the diffusion pattern along edge 41d is low, and the area density of the diffusion pattern opposite this side near edge 41b is high. Through diffusion pattern 52, the light introduced to polarizer 61 is diffused and a uniform light is released from upper surface 61a of polarizer 61 towards the liquid crystal display panel.

FIG. 18 shows the temperature distribution on liquid crystal display panel 10 of this embodiment of the invention. From viewing this graph it can be seen that the temperature rise of the panel directly on the fluorescent light only increases about 10 degrees above the regular temperature. As shown from FIG. 22, this a great reduction from when a conventional illumination device is used. Because of very little difference between the temperature of the central portion of the liquid crystal display panel and the temperature of the edge portion near the light source and the resulting flat temperature distribution, there is a very low amount of image and brightness irregularities that appear on the liquid crystal display panel. Consequently, a good quality image can be obtained. Therefore, illumination device 50 is an illumination device that can irradiate a light of high brightness for color displays and can prevent a temperature rise on the liquid crystal display panel. Because of the use of a long light source bent in a U-shape, the amount of heating per unit length can be reduced and, still further, a reduction in power consumption achieved.

In the present embodiment of the liquid crystal display device, as shown in FIG. 13, driver IC 13 is arranged on one of the sides of the U-shaped fluorescent light. However, because the rise in temperature of fluorescent light 62 is low, thermal expansion towards driver IC is low and problems such as fluctuations in the threshold value can be controlled.

Consequently, the liquid crystal display of this embodiment can obtain a vivid and stable color image with high brightness and low power consumption. As only one driver circuit is necessary to turn on the fluorescent light, devices that use liquid crystal displays, such as televisions and personal computers, can be miniaturized. Because the discharge length is increased, the driver circuit output must be improved to turn on the U-shaped fluorescent light. However, when compared to turning on three separate fluorescent lights, the increase in output of the driver circuit is small.

FIG. 19 shows an example of two approximately L-shaped fluorescent lights 72a and 72b installed on polarizer 71. FIG. 20 shows three approximately L-shaped fluorescent lights 82a, 82b, and 82c installed on hexagonal polarizer 81. The corners are removed from the edge portion 40 of both polarizer 71 and 81 so that there is no interference with fluorescent light 72 and 82 and so that these lights can be properly positioned. Structures discussed in the above embodiments, such as those of the reflectors, can be used.

Various shapes of surface-type illumination systems can be formed using a bent, cylindrical illuminant. With these illumination devices, a uniform illumination device with high brightness can be obtained that has low power consumption. Also, a high quality color display can be obtained when using a color liquid crystal display panel.

USES IN INDUSTRY

This surface-type illumination device is suitable for use as a backlight in liquid crystal display devices that use a liquid crystal display panel or for use as other flat, surface-type illumination devices. Because liquid crystal display devices using this illumination device can display vivid color with low power consumption, it can be used as a display in notebook PCs and other information processing devices as well as in devices such as liquid crystal TVs, video cameras, and other image processing devices.

What is claimed is:

1. An illumination device, comprising:
   a substantially transparent light guide plate having first and second surfaces opposite to each other and a diffusion pattern arranged on said first surface, said light guide plate including a cutout portion at a corner between its two adjacent sides; and
   an L-shaped illuminant disposed around said cutout portion of said light guide plate such that said illuminant faces the two adjacent sides of said light guide plate, said illuminant introducing light into said light guide plate;
   wherein said diffusion pattern causes light within said light guide plate to evenly emit out from said second surface of said light guide plate.

2. The illumination device of claim 1, wherein the cutout portion of said light guide plate has a shape of an isosceles triangle.

3. The illumination device of claim 2, wherein the length of one side of the isosceles triangle is approximately 0.6 times to 1.0 times the smallest radius of curvature of a bent portion of said illuminant that forms the corner of the L shape.

4. The illumination device of claim 2, further comprising a shield member, attached to the corner of said light guide plate, for reflecting away light from said illuminant.

5. The illumination device of claim 1, wherein the cutout portion of said light guide plate has a diamond shape.

6. The illumination device of claim 5, wherein the length of one side of the diamond shape is approximately 0.6 times to 1.0 times the smallest radius of curvature of a bent portion of said illuminant that forms the corner of the L shape.

7. The illumination device of claim 5 further comprising a shield member, attached to the corner of said light guide plate, for reflecting array light from said illuminant.

8. The illumination device of claim 1, wherein said light guide plate further includes a cutout portion at each of its corners.

9. The illumination device of claim 1, further comprising a first reflector and a second reflector disposed along the two adjacent sides of said light guide plate and covering said L-shaped illuminant so as to direct the light emitted from said illuminant substantially toward said light guide plate.

10. The illumination device of claims 1, further comprising a first reflector that covers a lower portion of said illuminant from a bottom side of said light guide plate and a second reflector that covers an upper portion of said illuminant from a top side of said light guide plate.

11. An illumination device, comprising:
    a substantially rectangular light guide plate having a diffusion pattern arranged on its one surface and a cutout portion at a corner between its two adjacent sides, said diffusion pattern having a fixed area density; and
    an L-shaped illuminant disposed around said cutout portion of said light guide plate such that said illuminant faces the two adjacent sides of said light guide plate, said illuminant introducing light into said light guide plate;
    wherein said diffusion pattern causes light within said light guide plate to evenly emit out of said light guide plate.

12. The illumination device of claim 11 wherein
    the two adjacent sides of said light guide plate are composed of a first side and a second side, and
    the thickness of said light guide plate is made inversely proportional to the density distribution of said diffusion pattern which is calculated by:
    computing a first predicted emitted light intensity distribution for a first direction along said first side based on the intensity of the light incident to said light guide plate from said second side and the density distribution of a presupposed diffusion pattern;
    computing a second predicted emitted light intensity distribution for a second direction along said second side based on the intensity of the light incident to said light guide plate from said first side and the density distribution of the presupposed diffusion pattern;
    computing a sum of said first and second predicted emitted light intensity distributions; and
    computing the density distribution of said diffusion pattern by compensating the density distribution of the presupposed diffusion pattern so that the sum of said first predicted emitted light intensity distribution and said second predicted emitted light intensity distribution on any rectangular area of said light guide plate fit within a desired range of light intensity.

13. The illumination device of claim 12 wherein the illumination device further includes an edge reflector disposed along at least one of the two sides opposite to said first side and said second side, said edge reflector reflecting the light emitted by said light guide plate back to said light guide plate, and the density distribution of said diffusion pattern is computed by:

computing a reflected light intensity of the light reflected by said edge reflector and incident to said light guide plate with a fixed attenuation factor;

computing a predicted emitted light intensity distribution for at least one of the first and second directions for said reflected light intensity; and adding the predicted emitted light intensity distribution for said reflected light intensity to the sum of said first predicted emitted light intensity distribution and said second predicted emitted light intensity distribution which are on a particular rectangular area of said light guide plate so as to compensate the density distribution of said diffusion pattern.

14. A liquid crystal display device, comprising:

a substantially rectangular light guide plate having first and second surfaces opposite to each other and a diffusion pattern arranged on said first surface, said light guide plate including a cutout portion at a corner between its two adjacent sides;

an L-shaped illuminant disposed around said cutout portion of said light guide plate such that said illuminant faces the two adjacent sides of said light guide plate, said illuminant emitting light toward said light guide plate;

a liquid crystal display which is illuminated by light emitted from said second surface of said light guide plate; and a driver which drives said liquid crystal display, said driver arranged along the two sides opposing the two adjacent sides of said light guide plate.

15. The liquid crystal display device of claim 14, wherein:

the two adjacent sides of said light guide plate are composed of a first side and a second side; and the density distribution of said diffusion pattern is computed by:

computing a first predicted emitted light intensity distribution for a first direction along said first side based on the intensity of the light incident to said light guide plate from said second side and the density distribution of a presupposed diffusion pattern;

computing a second predicted emitted light intensity distribution for a second direction along said second side based on the intensity of the light incident to said light guide plate from said first side and the density distribution of the presupposed diffusion pattern;

computing a sum of said first and second predicted emitted light intensity distributions; and computing the density distribution of said diffusion pattern by compensating the density distribution of the presupposed diffusion pattern so that the sum of said first predicted emitted light intensity distribution and said second predicted emitted light intensity distribution on any rectangular area of said light guide plate fit within a desired range of light intensity.

16. The liquid crystal display device of claim 15, further including:

an edge reflector disposed along at least one of the two sides opposite to said first side and said second side, said edge reflector reflecting the light emitted by said light guide plate back to said light guide plate; and wherein the density distribution of said diffusion pattern is computed by:

computing a reflected light intensity of the light reflected by said edge reflector and incident to said light guide plate with a fixed attenuation factor;

computing a predicted emitted light intensity distribution for at least one of the first and second directions for said reflected light intensity; and adding the predicted emitted light intensity distribution for said reflected light intensity to the sum of said first predicted emitted light intensity distribution and said second predicted emitted light intensity distribution which are on a particular rectangular area of said light guide plate so as to compensate the density distribution of said diffusion pattern.

17. The liquid crystal display device of claim 14, wherein:

the two adjacent sides of said light guide plate are composed of a first side and a second side; and the thickness of said light guide plate is made inversely proportional to the density distribution of said diffusion pattern, and the density distribution of said diffusion pattern is calculated by computing a first predicted emitted light intensity distribution for a first direction along said first side based on the intensity of the light incident to said light guide plate from said second side and the density distribution of a presupposed diffusion pattern;

computing a second predicted emitted light intensity distribution for a second direction along said second side based on the intensity of the light incident to said light guide plate from said first side and the density distribution of the presupposed diffusion pattern;

computing a sum of said first and second predicted emitted light intensity distributions; and computing the density distribution of said diffusion pattern by compensating the density distribution of the presupposed diffusion pattern so that the sum of said first predicted emitted light intensity distribution and said second predicted emitted light intensity distribution on any rectangular area of said light guide plate fit within a desired range of light intensity.

18. The liquid crystal display device of claim 17, further including:

an edge reflector disposed along at least one of the two sides opposite to said first side and said second side, said edge reflector reflecting the light emitted by said light guide plate back to said light guide plate; and wherein the thickness of said light guide plate is made inversely proportional to the density distribution of said diffusion pattern which is computed by:

computing a reflected light intensity of the light reflected by said edge reflector and incident to said light guide plate with a fixed attenuation factor;

computing a predicted emitted light intensity distribution for at least one of the first and second directions for said reflected light intensity; and adding the predicted emitted light intensity distribution for said reflected light intensity to the sum of said first predicted emitted light intensity distribution and said second predicted emitted light intensity distribution which are on a particular rectangular area of said light guide plate so as to compensate the density distribution of said diffusion pattern.

* * * * *